US010819991B2

(12) United States Patent
Lee et al.

(10) Patent No.: US 10,819,991 B2
(45) Date of Patent: *Oct. 27, 2020

(54) METHOD FOR CODING AND DECODING SCALABLE VIDEO AND APPARATUS USING SAME

(71) Applicants: Electronics and Telecommunications Research Institute, Daejeon (KR); KWANGWOON UNIVERSITY INDUSTRY-ACADEMIC COLLABORATION FOUNDATION, Seoul (KR)

(72) Inventors: Ha Hyun Lee, Seoul (KR); Jung Won Kang, Daejeon-si (KR); Jin Soo Choi, Daejeon-si (KR); Jin Woong Kim, Daejeon-si (KR); Dong Gyu Sim, Seoul (KR); Hyo Min Choi, Seoul (KR); Jung Hak Nam, Seoul (KR)

(73) Assignees: Electronics and Telecommunications Research Institute, Daejeon (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,712

(22) Filed: Oct. 22, 2018

(65) Prior Publication Data
US 2019/0058891 A1 Feb. 21, 2019

Related U.S. Application Data

(63) Continuation of application No. 15/585,687, filed on May 3, 2017, now Pat. No. 10,142,648, which is a (Continued)

(30) Foreign Application Priority Data

Jun. 15, 2011 (KR) .......................... 10-2011-0057906
Jun. 15, 2012 (KR) .......................... 10-2012-0064634

(51) Int. Cl.
*H04N 19/11* (2014.01)
*H04N 19/30* (2014.01)
(Continued)

(52) U.S. Cl.
CPC ............. *H04N 19/30* (2014.11); *H04N 19/11* (2014.11); *H04N 19/176* (2014.11);
(Continued)

(58) Field of Classification Search
CPC ...... H04N 19/30; H04N 19/176; H04N 19/11; H04N 19/503; H04N 19/33; H04N 19/187; H04N 19/59; H04N 19/36; H04N 19/103
(Continued)

(56) References Cited

U.S. PATENT DOCUMENTS 8,194,735 B2 * 6/2012 Matsumura .......... H04N 19/139
348/397.1
8,249,155 B2 * 8/2012 Yatabe ................. H04N 19/105
375/240.01
(Continued)

FOREIGN PATENT DOCUMENTS

CN 101163241 A 4/2008
CN 101198064 A 6/2008
(Continued)

OTHER PUBLICATIONS

Segall, C. Andrew, et al. "Spatial scalability with the H. 264/AVC scalabe video coding extension." *IEEE Transactions on Circuits and Systems for Video Technology* 17.9 (2007): 1121-1135. (15 pages, in English).
(Continued)

*Primary Examiner* — Shan E Elahi
(74) *Attorney, Agent, or Firm* — NSIP Law

(57) ABSTRACT

The present invention relates to a method and an apparatus for interlayer prediction, and the method for interlayer prediction, according to the present invention, comprises the steps of: deciding whether to apply an interlayer prediction to an enhancement layer; and performing a prediction on a current block of the enhancement layer based on reference information that is generalized and generated from a refer-
(Continued)

ence picture, which is decoded, of a reference layer, when the interlayer prediction is applied, wherein the reference layer information can be encoding information of a reference block, which corresponds to a current block of the enhancement layer, from the reference layer, and residual information.

8 Claims, 16 Drawing Sheets

Related U.S. Application Data continuation of application No. 14/125,840, filed as application No. PCT/KR2012/004777 on Jun. 15, 2012, now Pat. No. 9,686,543.

(51) Int. Cl.
```
H04N 19/176   (2014.01)
H04N 19/187   (2014.01)
H04N 19/33    (2014.01)
H04N 19/503   (2014.01)
H04N 19/59    (2014.01)
H04N 19/103   (2014.01)
H04N 19/36    (2014.01)
```

(52) U.S. Cl.
CPC ........... *H04N 19/187* (2014.11); *H04N 19/33* (2014.11); *H04N 19/503* (2014.11); *H04N 19/103* (2014.11); *H04N 19/36* (2014.11); *H04N 19/59* (2014.11)

(58) Field of Classification Search
USPC .................................................. 375/240.12
See application file for complete search history.

(56) References Cited

U.S. PATENT DOCUMENTS

| | | | |
|---|---|---|---|
| 8,265,152 B2* | 9/2012 | Anisimov | H04N 19/593 348/403.1 |
| 8,422,555 B2* | 4/2013 | Wang | H04N 19/105 375/240.01 |
| 8,634,457 B2* | 1/2014 | Lee | H04N 19/61 375/240.01 |
| 8,660,176 B2* | 2/2014 | Lee | H04N 19/70 375/240.02 |
| 8,700,794 B2* | 4/2014 | Kim | H04N 21/23432 341/106 |
| 8,724,697 B2* | 5/2014 | Lee | H04N 19/52 375/240.02 |
| 8,923,395 B2* | 12/2014 | Wang | H04N 19/176 375/240.01 |
| 8,923,407 B2 | 12/2014 | Sze et al. | |
| 9,113,147 B2 | 8/2015 | Raveendran et al. | |
| 9,319,729 B2 | 4/2016 | Sullivan | |
| 9,357,212 B2 | 5/2016 | Zhang et al. | |
| 9,641,866 B2 | 5/2017 | Chong et al. | |
| 9,906,786 B2 | 2/2018 | Seregin et al. | |
| 9,948,939 B2 | 4/2018 | Zhang et al. | |
| 10,021,414 B2* | 7/2018 | Seregin | H04N 19/70 |
| 2004/0013195 A1 | 1/2004 | Panusopone et al. | |
| 2006/0083308 A1 | 4/2006 | Schwarz et al. | |
| 2006/0083309 A1 | 4/2006 | Schwarz et al. | |
| 2006/0126962 A1* | 6/2006 | Sun | H04N 19/136 382/268 |
| 2006/0153294 A1 | 7/2006 | Wang et al. | |
| 2007/0074266 A1 | 3/2007 | Raveendran et al. | |
| 2007/0086521 A1 | 4/2007 | Wang et al. | |
| 2007/0160133 A1 | 7/2007 | Bao et al. | |
| 2007/0230575 A1 | 10/2007 | Han | |
| 2007/0263087 A1 | 11/2007 | Hong et al. | |
| 2007/0291842 A1* | 12/2007 | Au | H04N 19/86 375/240.15 |
| 2008/0013633 A1 | 1/2008 | Ye et al. | |
| 2008/0089417 A1 | 4/2008 | Bao et al. | |
| 2009/0141814 A1 | 6/2009 | Yin et al. | |
| 2009/0175349 A1 | 7/2009 | Ye et al. | |
| 2009/0187960 A1* | 7/2009 | Lee | H04L 65/607 725/131 |
| 2010/0080284 A1* | 4/2010 | Lee | H04N 19/176 375/240.02 |
| 2010/0080285 A1* | 4/2010 | Lee | H04N 19/61 375/240.02 |
| 2010/0080296 A1* | 4/2010 | Lee | H04N 19/52 375/240.16 |
| 2010/0098156 A1 | 4/2010 | Karczewicz et al. | |
| 2010/0111182 A1 | 5/2010 | Karczewicz et al. | |
| 2010/0309974 A1* | 12/2010 | Reznik | H04N 19/625 19/625 |
| 2011/0038421 A1 | 2/2011 | Schwarz et al. | |
| 2011/0134999 A1 | 6/2011 | Han et al. | |
| 2011/0248873 A1 | 10/2011 | Karczewicz et al. | |
| 2012/0236115 A1* | 9/2012 | Zhang | H04N 19/597 348/43 |
| 2013/0188717 A1 | 7/2013 | Chen et al. | |
| 2013/0188719 A1 | 7/2013 | Chen et al. | |
| 2013/0194386 A1 | 8/2013 | Leontaris et al. | |
| 2013/0272372 A1 | 10/2013 | Hannuksela et al. | |
| 2013/0279576 A1 | 10/2013 | Chen et al. | |
| 2014/0044161 A1 | 2/2014 | Chen et al. | |
| 2014/0064386 A1 | 3/2014 | Chen et al. | |
| 2014/0192885 A1* | 7/2014 | Seregin | H04N 19/52 375/240.16 |
| 2014/0254666 A1* | 9/2014 | Rapaka | H04N 19/17 375/240.12 |
| 2016/0261877 A1 | 9/2016 | Wang | |
| 2016/0381385 A1 | 12/2016 | Ugur | |

FOREIGN PATENT DOCUMENTS

| | | |
|---|---|---|
| CN | 101822060 A | 9/2010 |
| CN | 101888559 A | 11/2010 |
| KR | 10-2007-0096884 A | 10/2007 |
| KR | 10-2009-0016544 A | 2/2009 |
| KR | 10-2011-0052203 A | 5/2011 |

OTHER PUBLICATIONS

Choi, Hyomin, et al. "Scalable structures and inter-layer predictions for HEVC scalable extension." Joint Collaborative Team on Vidoe Coding (JCT-VC) of ITU-T SG16 WP3 and ISO/IEE JTC1/SC29/WG11. 6th Meeting: Torino, Italy, Jul. 14-22, 2011. Document: JCTVC-F096. XP30009119. URL: http://wftp3.itu.int/av-arch/jctvc-site/. Saved: Jul. 1, 2011. (Jul. 14-22, 2011). (11 pages in English).

Extended European Search Report dated Jan. 30, 2015 in counterpart European Application No. 12 80 1420.6 (9 pages in English).

International Search Report dated Dec. 21, 2012 in corresponding International Patent Application No. PCT/KR2012/00477 (3 pages, in Korean).

Reichel, Julien et al, "Joint Scalable Video Model JSVM-4," *Joint Video Team (JVT) of ISO/IEC MPEG & ITU-T VCEG* (ISO/IEC JTC1/SC29/WG11 and ITU-T SG16 Q.6), 17th Meeting: Nice, France, Oct. 2005, Document: JVT-Q202. XP030006256, Nov. 18, 2005 (41 pages in English).

Chun-Su Park et al., "Selective Inter-layer Residual Prediction for SVC-based Video Streaming," *IEEE Transactions on Consumer Electronics*, vol. 55, No. 1, Jan. 15, 2009, pp.235-239.

Schwarz, Heido, et al. "Constrained Inter-Layer Prediction for Single-Loop Decoding in Spatial Scalability," *IEEE International Conference on Image Processing*, ICIP 2005, Piscataway, NJ, USA, vol. 2, XP010581192, Sep. 11, 2005, pp. 870-873.

Alfonso, D., et al., "Multiple Description for Robust Scalable Video Coding", *2009 16th IEEE International Conference on Image Processing (ICIP)*, 2009 (pp. 905-908).

(56) References Cited

OTHER PUBLICATIONS

Sun Yang et al., "Multimedia Communication and Scalable Video Coding,"*Proceedings of the 2011 Fourth International Conference on Intelligent Computation technology and Automation*, Computer Society 2011, pp. 616-619.
"ITU-T H.264: Advanced video coding for generic audiovisual services", Series H: Audiovisual and Multimedia Systems Infrastructure of audiovisual services-Coding of moving video, *Telecommunication Standardization Sector of ITU*, Nov. 2007 (pp. 1-562).

* cited by examiner

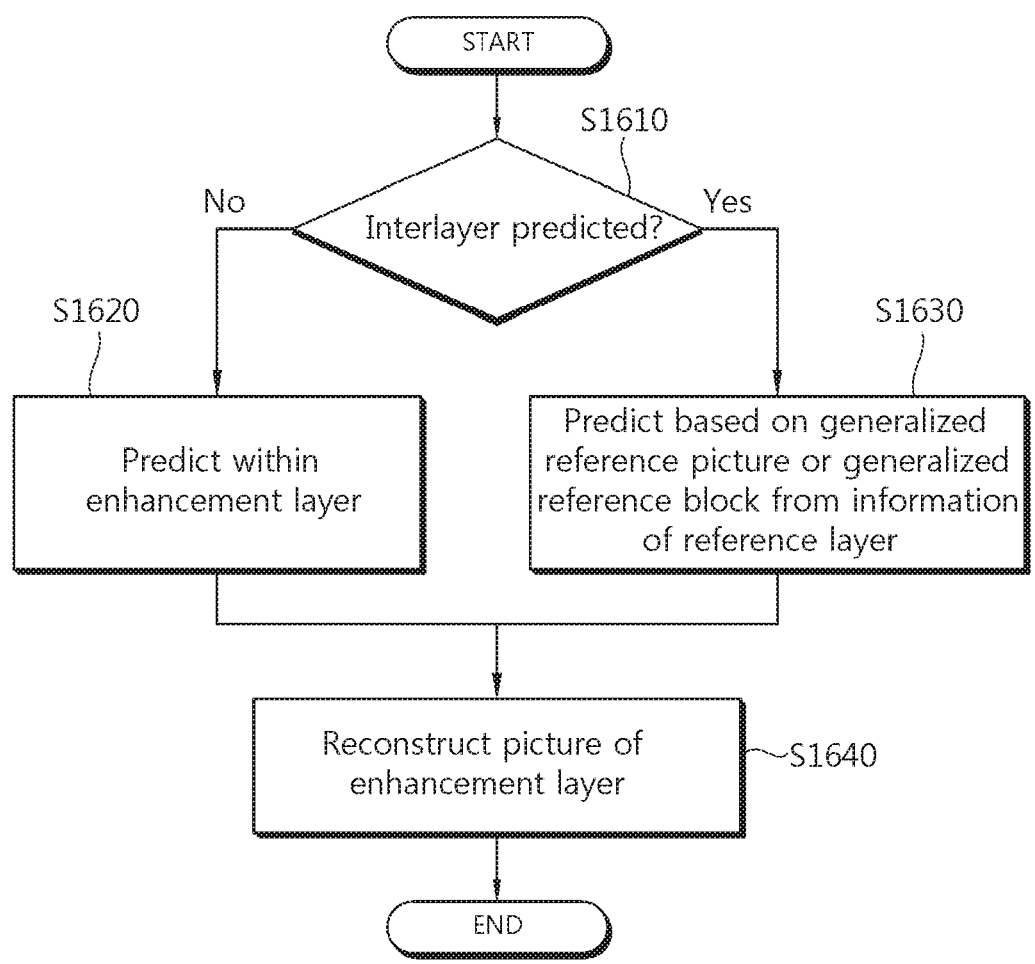

METHOD FOR CODING AND DECODING SCALABLE VIDEO AND APPARATUS USING SAME

CROSS-REFERENCE TO RELATED APPLICATIONS

This application is a continuation of U.S. patent application Ser. No. 15/585,687 filed on May 3, 2017, now U.S. Pat. No. 10,142,648 issued on Nov. 27, 2018, which is a continuation of U.S. patent application Ser. No. 14/125,840 having a 371(c) date of Dec. 12, 2013, now U.S. Pat. No. 9,686,543 issued on Jun. 20, 2017, which is a U.S. national stage application of International Application No. PCT/KR2012/004777 filed on Jun. 15, 2012, which claims the benefit of Korean Patent Application No. 10-2011-0057906 filed on Jun. 15, 2011 and Korean Application No. 10-2012-0064634 filed on Jun. 15, 2012, in the Korean Intellectual Property Office, the entire disclosures of which are incorporated herein by reference for all purposes.

TECHNICAL FIELD

The present invention relates to processing of image information and, more particularly, to a video encoding method and a video decoding method using scalable video coding (SVC), and an apparatus using the same.

BACKGROUND ART

Recently, various terminals and networks have been used according to establishment of a multimedia environment, and in line with this, user needs have also been diversified.

For example, as terminal performance and computing ability are diversified, a variety of performance is supported by devices. Also, networks via which information is transmitted have also been diversified in functions such as forms of transmitted information, amounts and speeds of information, and the like, as well as external structures such as wired/wireless networks. Users may select a terminal and a network to be used according to a desired function, and a variety of spectrums of terminals and networks are provided to users by enterprises.

In this connection, recently, a broadcast having high definition resolution has been expansively provided worldwide, as well as domestically, a great number of users are becoming accustomed to high resolution, high picture images. Thus, a great many image service-related organizations or institutions have applied the spur to develop a next-generation image display device.

Also, in addition to HDTV, as interests in ultra-high definition (UHD) having resolution equal to or greater than 4 times the HDTV are increasing, demand for a technique of compressing and processing an image having high resolution and high picture quality is on the rise.

In order to compress and process an image, inter-prediction technique for predicting a pixel value included in a current picture from a temporally previous and/or subsequent picture, an intra-prediction technique for predicting a different pixel value included in a current picture by using pixel information within the current picture, and an entropy encoding technique for allocating a short code to a symbol having high frequency and a long code to a symbol having low frequency, or the like, may be used.

As mentioned above, in consideration of the terminals and networks each supporting different functions and diversified user needs, quality, size, frame, and the like, of supported images, are required to be diversified.

Thus, due to heterogeneous communication networks and various types of terminals having various functions, scalability variably supporting picture quality, resolution, size, frame rate, and the like, is an important function of video formatting.

Thus, in order to provide services required by users in various environments based on a high efficiency video encoding method, it is required to provide a scalability function allowing for effective video encoding and decoding in terms of time, space, picture quality, and the like.

DISCLOSURE

Technical Problem

An aspect of the present invention provides a method and apparatus capable of effectively performing video encoding and video decoding.

Another aspect of the present invention provides a method and apparatus capable of providing various video services in various environments.

Another aspect of the present invention provides a method and apparatus capable of providing various video services in terms of time, space, and/or picture quality according to a user demand or purpose.

Another aspect of the present invention provides a method and apparatus capable of providing video services having various picture qualities, resolutions, sizes and/or frame rates while obtaining a gain of a bit rate in comparison to the simultaneous broadcast (simulcast).

Technical Solution (1) In an embodiment of the present invention, an interlayer prediction method includes: determining whether to apply interlayer prediction to an enhancement layer; and when interlayer prediction is applied, performing prediction on a current block of the enhancement layer based on generalized reference information generated from information of a reference layer, wherein the information of the reference layer is encoding information and residual information of a reference block corresponding to the current block of the enhancement layer in the reference layer.

(2) In (1), whether to apply interlayer prediction to the enhancement layer may be determined based on flag information indicating interlayer prediction.

(3) In (1), the encoding information may include at least one of motion vector information regarding a block corresponding to the current block of the enhancement layer, reference picture information, motion vector estimator candidate information, merge candidate information, and intra-prediction mode.

(4) In (1), the generalized reference information may be a generalized reference picture generated based on decoded picture of the reference layer, and in the performing of prediction on the current block of the enhancement layer, the generalized reference picture may be used as a reference picture of the current block.

(5) In (4), the generalized reference picture may be included in a reference picture list with respect to the current block of the enhancement layer and used as a reference picture with respect to the current block of the enhancement layer.

(6) In (4), enhancement based on a difference between pictures of the enhancement layer and the reference layer may be applied to the generalized reference picture.

(7) In 4), the generalized reference picture may be a decoded picture of the base layer, a picture obtained by upsampling the decoded picture of the base layer, a picture generated based on the decoded picture of the base layer and the residual information, or a picture obtained by upsampling the decoded picture of the base layer and the residual information.

(8) In (1), the generalized reference information may be a generalized reference block generated based on the decoded picture of the reference layer, and in the performing of prediction on the current block of the enhancement layer, the generalized reference block may be set as a prediction block with respect to the current block of the enhancement layer.

(9) In (8), the generalized reference block may be a block to which enhancement based on a difference between pictures of the enhancement layer and the reference layer has been applied.

(10) In (1), the generalized reference information may be a generalized reference picture generated based on the encoding information from the reference layer, and in the performing of prediction on the current block of the enhancement layer, the generalized reference picture may be used as a reference picture with respect to the current block of the enhancement layer.

(11) In (10), the generalized reference picture may be included in a reference picture list with respect to the current block of the enhancement layer and used as a reference picture with respect to the current block of the enhancement layer.

(12) In (10), the generalized reference picture may be a picture to which enhancement based on a difference between pictures of the enhancement layer and the reference layer has been applied.

(13) In (10), the generalized reference picture may be a decoded picture of the base layer, a picture obtained by upsampling the decoded picture of the base layer, a picture generated based on the decoded picture of the base layer and the residual information, or a picture obtained by upsampling the decoded picture of the base layer and the residual information.

(14) In (1), the generalized reference information may be a generalized reference picture generated based on the encoding information from the reference layer, and in the performing of prediction on the current block of the enhancement layer, the generalized reference picture may be used as a prediction block with respect to the current block of the enhancement layer.

(15) In (14), the generalized reference block may be a block to which enhancement based on a difference between pictures of the enhancement layer and the reference layer has been applied.

(16) In (14), when the reference block is intra-predicted, the generalized reference block may be generated based on a prediction block obtained by applying an intra-prediction mode applied to the reference block in the reference layer, to the reference block in the enhancement layer.

(17) In (14), when the reference block is intra-predicted, the generalized reference block may be generated based on a prediction block obtained by applying an intra-prediction mode applied to the reference block in the reference layer, to the reference block in the enhancement layer and the residual information.

(18) In another embodiment of the present invention, a scalable encoding apparatus includes: a base layer encoding unit configured to perform prediction on an input image of a base layer; an enhancement layer encoding unit configured to perform prediction on an input image of an enhancement layer; and an interlayer prediction unit configured to generate generalized reference information to perform prediction on the input image of the enhancement layer, wherein when interlayer prediction is applied, the interlayer prediction unit generates generalized reference information from decoded information of the base layer and the enhancement layer encoding unit performs prediction on a current block of the enhancement layer based on the generalized reference information.

(19) In another embodiment of the present invention, a scalable decoding apparatus includes: a base layer decoding unit configured to perform prediction on an image of a base layer; an enhancement layer decoding unit configured to perform prediction on an image of an enhancement layer; and an enhancement layer prediction unit configured to generate generalized reference information to perform prediction on the image of the enhancement layer, wherein when interlayer prediction is applied, the interlayer prediction unit generates generalized reference information from decoded information of the base layer and the enhancement layer decoding unit performs prediction on a current block of the enhancement layer based on the generalized reference information.

Advantageous Effects

According to an embodiment of the present invention, various video services can be effectively provided in various environments.

According to an embodiment of the present invention, various video services can be provided in terms of time, space, and/or picture quality according to various needs or usage purposes.

According to an embodiment of the present invention, scalable video coding, which are able to provide various services in various environments, can be effectively performed.

According to an embodiment of the present invention, video services having a variety of picture quality, resolution, size and/or frame rate, while obtaining a gain of a bit rate in comparison to simultaneous broadcast (simulcast), can be provided.

DESCRIPTION OF DRAWINGS

FIG. 16 is a flow chart illustrating interlayer prediction performed according to an embodiment of the present invention according to an embodiment of the present invention.

MODE FOR INVENTION

Hereinafter, embodiments of the present invention will be described in detail with reference to the accompanying drawings. In describing the present invention, if a detailed explanation for a related known function or construction is considered to unnecessarily divert the gist of the present invention, such explanation will be omitted but would be understood by those skilled in the art.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

Also, elements of the embodiments of the present invention are independently illustrated to show different characteristic functions, and it does not mean that each element is configured as separated hardware or a single software component. Namely, for the sake of explanation, respective elements are arranged to be included, and at least two of the respective elements may be incorporated into a single element or a single element may be divided into a plurality of elements to perform a function, and the integrated embodiment and divided embodiment of the respective elements are included in the scope of the present invention unless it diverts from the essence of the present invention.

Figure 1:
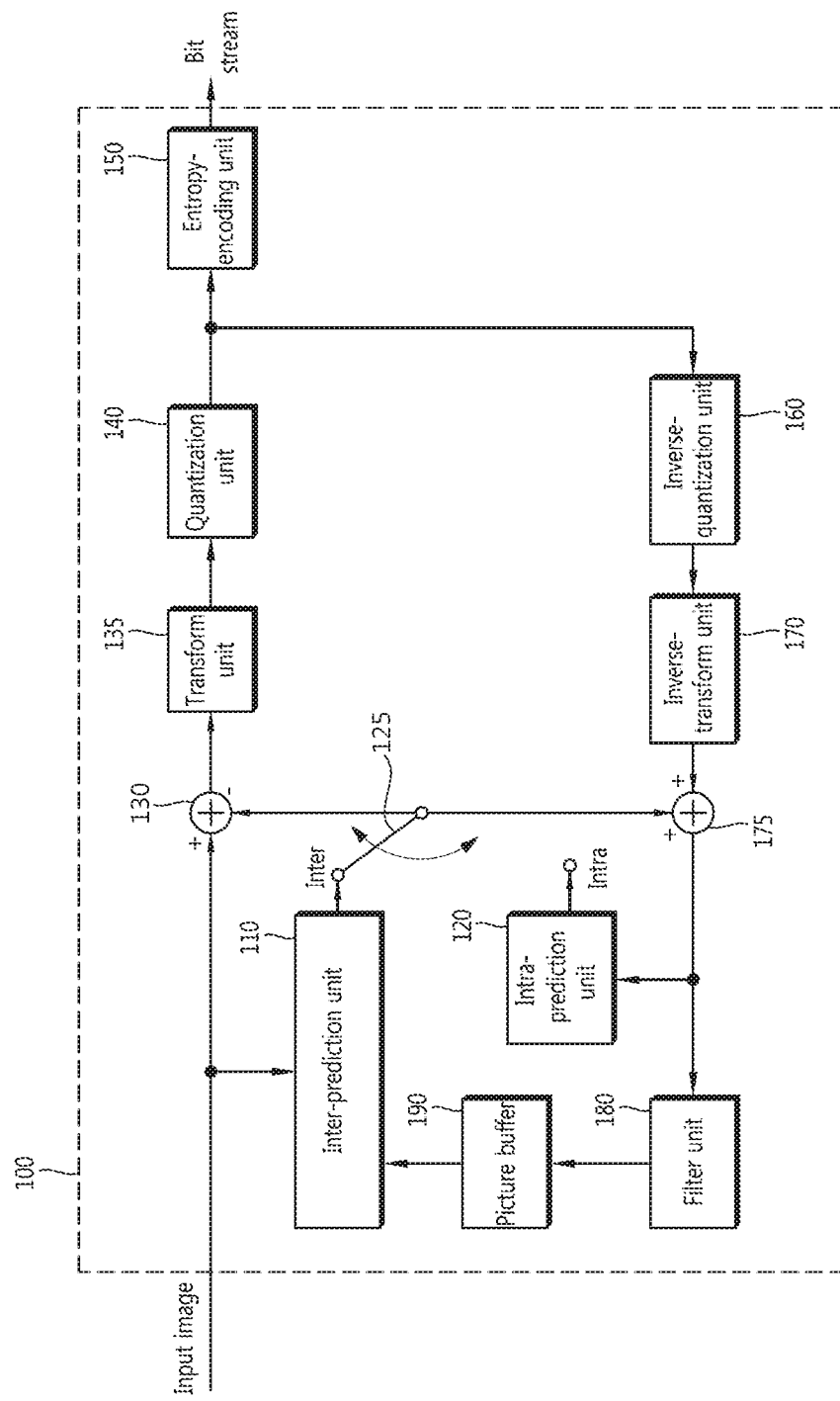
FIG. 1 is a block diagram illustrating a basic configuration of an encoding apparatus according to an embodiment of the present invention.

FIG. 1 is a block diagram illustrating a basic configuration of an encoding apparatus according to an embodiment of the present invention.

With reference to FIG. 1, an encoding apparatus 100 includes an inter-prediction unit 110, an intra-prediction unit 120, a switch 125, a subtractor 130, a transform unit 135, a quantization unit 140, an entropy-encoding unit 150, an inverse-quantization unit 160, an inverse-transform unit 170, an adder 175, a filter unit 180, and a picture buffer 190.

The encoding apparatus 100 may perform encoding on an input image in an intra-mode or an inter-mode and output a bit stream. In the case of the intra-mode, the switch 125 is switched to intra, and in the case of the inter-mode, the switch 125 is switched to inter. The encoding apparatus 100 may generate a prediction block with respect to an input block of an input image and encode a difference between the input block and the prediction block.

In the intra-mode, the intra-prediction unit 120 may generate a prediction block by performing spatial prediction by using a pixel value of a previously encoded block adjacent to a current block.

In the inter-mode, the inter-prediction unit 110 may search for a region corresponding to an input block from a reference image stored in the picture buffer 190 in a motion prediction process to obtain a motion vector. The inter-prediction unit 110 may generate a prediction block by performing motion compensation by using the motion vector and the reference image stored in the picture buffer 190.

The subtractor 130 may generate a residual block according to a difference between the input block and the generated prediction block. The transform unit 135 may perform transform on the residual block to output a transform coefficient. The quantization unit 140 may quantize the input transform coefficient according to a quantization parameter and output a quantized coefficient.

The entropy-encoding unit 150 entropy-encodes the quantized coefficient according to a probability distribution on the basis of values calculated by the quantization unit 140, an encoding parameter value calculated during an encoding process, and the like, to output a bit stream.

The quantized coefficient may be inversely quantized by the inverse-quantization unit 160 and inversely transformed by the inverse-transform unit 170. The inversely quantized and inversely transformed coefficient may be added to the prediction block through the adder 175 to generate a reconstructed block.

The reconstructed block passes through the filter unit 180, and the filter unit 180 may apply one or more of a deblocking filter, a sample adaptive offset (SAO), and an adaptive loop filter (ALF) to the reconstructed block or reconstructed picture. The reconstructed block which has passed through the filter unit 180 may be stored in the picture buffer 190.

Figure 2:
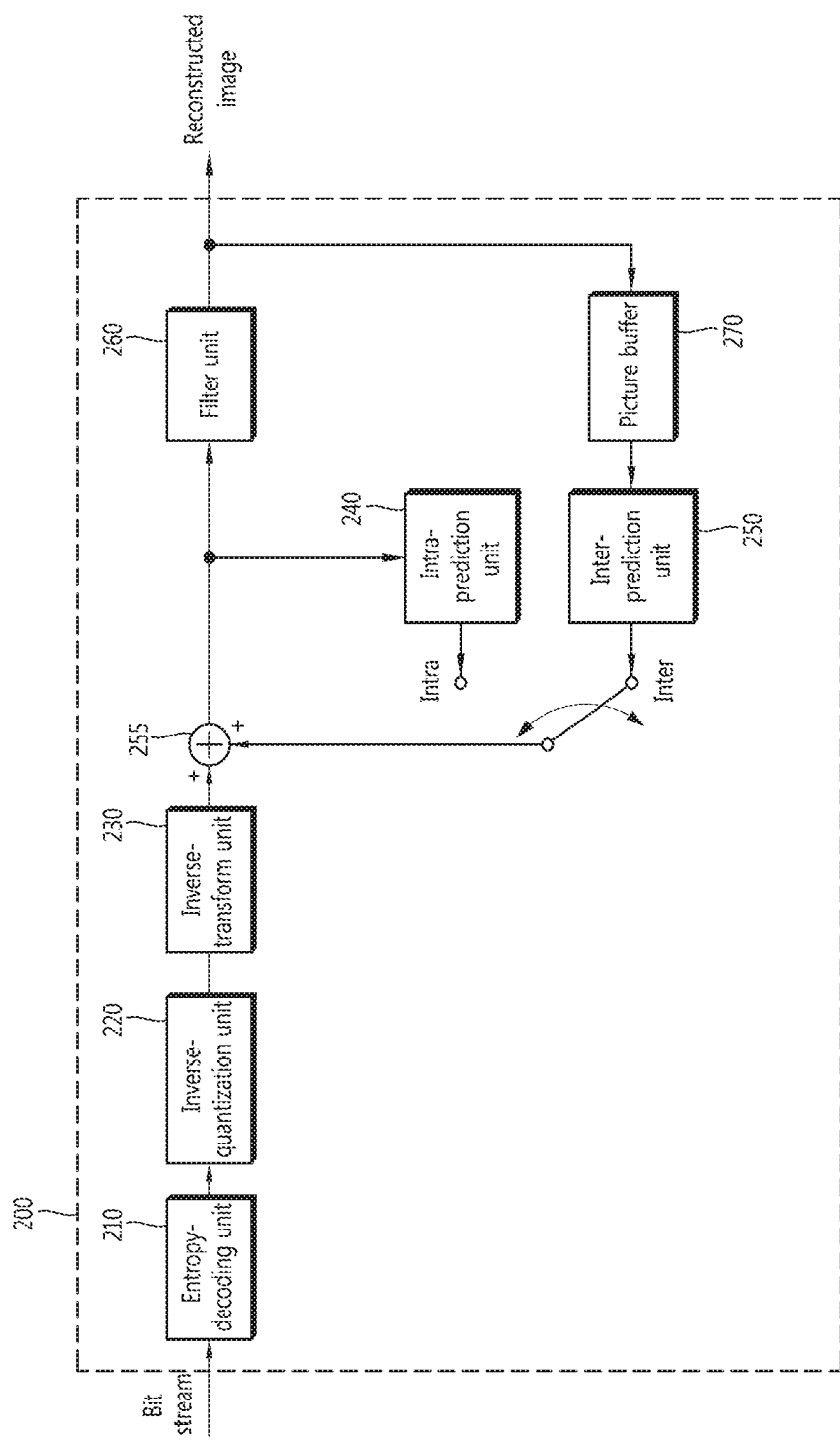
FIG. 2 is a block diagram illustrating a basic configuration of a decoding apparatus according to an embodiment of the present invention.

FIG. 2 is a block diagram illustrating a basic configuration of a decoding apparatus according to an embodiment of the present invention.

With reference to FIG. 2 the decoding apparatus 200 includes an entropy-decoding unit 210, an inverse-quantization unit 220, an inverse-transform unit 230, an intra-prediction unit 240, an inter-prediction unit 250, a filter unit 260, and a picture buffer 270.

The decoding apparatus 200 may receive a bit stream output from an encoding apparatus, perform decoding thereon in an intra-mode or inter-mode, and output a reconfigured image, i.e., a reconstructed image. In the case of the intra-mode, the switch may be switched to intra, and in the case of the inter-mode, the switch may be switched to inter.

The decoding apparatus 200 may obtain a reconstructed residual block from the input bit stream, generate a prediction block, and add the reconstructed residual block and the prediction block to generate a reconfigured block, i.e., a reconstructed block.

The entropy-decoding unit 210 entropy-decodes the input bit stream according to a probability distribution. Through the entropy-decoding, a quantized (transformed) coefficient may be generated.

The quantized coefficient is inversely quantized by the inverse-quantization unit 220 and inversely transformed by the inverse-transform unit 230, and as a result, a reconstructed residual block may be generated.

In the case of the intra-mode, the intra-prediction unit 240 may perform spatial prediction by using pixel values of a previously encoded block adjacent to a current block. In the case of the inter-mode, the inert-prediction unit 250 may perform motion compensation by using a motion vector and a reference image stored in the picture buffer.

The reconstructed residual block and the prediction block are added by the adder 255, and the added blocks pass through the filter unit 260. The filter unit 260 may apply at least one of a deblocking filter, an SAO, and an ALF to the reconstructed block or reconstructed picture. The filter unit 260 outputs a reconfigured image, i.e., a reconstructed image. The reconstructed image may be stored in the picture buffer 270 so as to be used for inter-prediction.

As described above, the encoding apparatus/decoding apparatus perform prediction on a current block for video encoding/decoding.

Prediction may be performed in the encoding apparatus/ decoding apparatus, specifically, a prediction unit of the encoding apparatus/decoding apparatus. The prediction unit of the encoding apparatus may include, for example, the inter-prediction unit 110, the intra-prediction unit 120, and the like. The prediction unit of the decoding apparatus may include, for example, the intra-prediction unit 240, the inter-prediction unit 250, and the like.

When a prediction mode of a current block is the intra-prediction mode, the prediction unit may perform prediction on the current block based on pixels (a reference sample) within a current picture which has been previously encoded according to the intra-prediction mode of the current block. The prediction unit may perform intro-prediction to generate a prediction block with respect to the current block from the reference sample.

Figure 3:
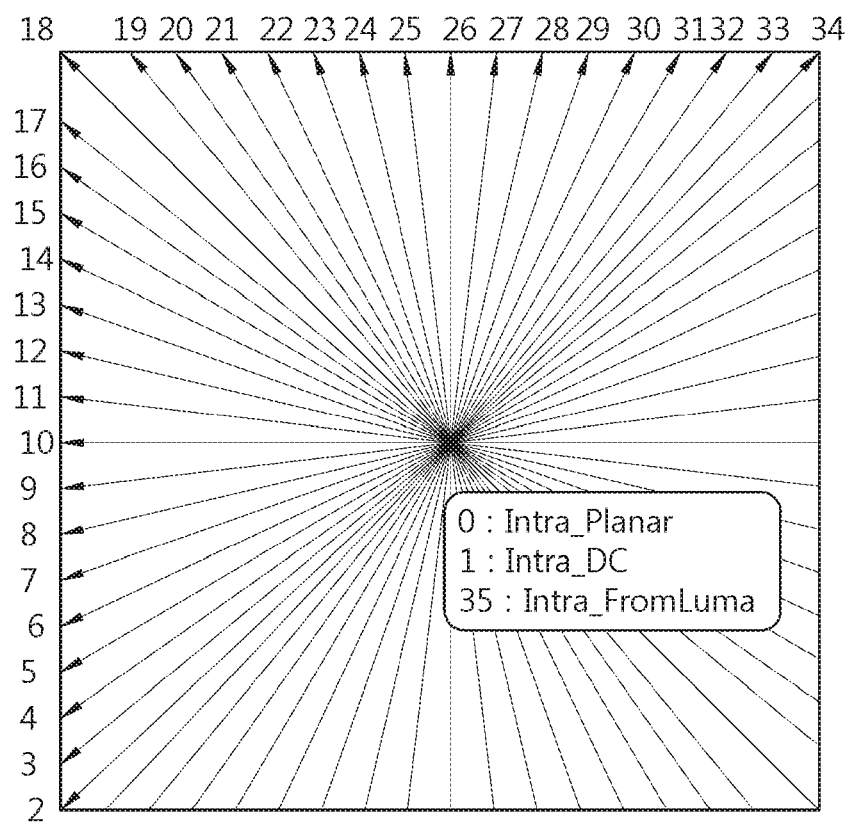
FIG. 3 is a view schematically illustrating an example of an intra-prediction mode.

FIG. 3 is a view schematically illustrating an example of an intra-prediction mode. In the intra-prediction, the prediction mode may include thirty-three directional prediction modes and two or more non-directional modes. In the example of FIG. 3, thirty-three directional prediction modes from 2 to 34 are illustrated. The non-direction modes may include a DC prediction mode, a planar mode, and the like.

In the intra-prediction, a prediction block may be generated by applying a filter to the reference sample. Here, whether to apply a filter to the reference sample may be determined according to an intra-prediction mode and/or size of the current block.

When the prediction mode with respect to the current block is the inter-prediction mode, the prediction unit may set at least one of a previous picture or a subsequent picture of a current picture as a reference picture and perform prediction on the current block based on the reference picture. An image used for the prediction of the current block is called a reference picture or a reference frame. A region within the reference picture may be indicated by using a reference picture index refIdx indicating a reference picture, a motion vector, and the like.

In the case of the inter-prediction, the prediction unit may select a reference picture and a reference block corresponding to a current block within the reference picture to generate a prediction block with respect to the current block. The prediction unit may generate the prediction block such that a residual signal with respect to the current block is minimized and a motion vector size is minimized.

In order to use information of the reference picture, information regarding neighbor blocks of the current block may be used. For example, a prediction block with respect to the current block may be generated base on information regarding neighbor blocks through a skip mode, a merge mode, advanced motion vector prediction (AMVP), and the like.

The prediction unit of the decoding apparatus may check a skip flag, a merge flag, and the like, received from the encoding apparatus and corresponding to this information, may derive motion information, e.g., information regarding a motion vector, a reference picture index, or the like, required for inter-prediction of the current block.

A processing unit in performing prediction, a prediction method, and a processing unit for determining specific content may be different from each other. For example, a prediction mode may be determined by PU, so prediction may be performed by PU, or prediction mode may be determined by PU and intra-prediction may be performed by TU.

With respect to a current picture, a reference picture list may be configured with pictures used for prediction, and a reference picture index may indicate a particular reference picture on the reference picture list.

A P picture is a picture that may be encoded or decoded by using inter-prediction or intra-prediction using at least one motion vector and reference picture index in order to predict a sample value of each block. A B picture is a picture that may be encoded or decoded by using inter-prediction or intra-prediction using at least two motion vectors and reference picture indexes in order to predict a sample value of each block. Besides the P picture and the B picture, there is an I picture to which intra-prediction is applied.

In the inter-prediction, in the case of the skip mode, the prediction unit may use information regarding neighbor blocks as it is for the current block. Thus, in the case of the skip mode, except for information indicating motion information of which block is to be used as motion information of the current block, the encoding apparatus does not transmit syntax information such as residual, or the like.

Also, in the case of the merge mode, the prediction unit may generate a prediction block with respect to the current block by using the motion information of the neighbor blocks as it is. The encoding apparatus may transmit information regarding whether or not the merge mode is applied, information regarding motion information of which block is to be used, residual information, and the like, to the decoding apparatus. The decoding apparatus may reconstruct the current block by adding the prediction block and the residual transmitted from the encoding apparatus.

In the case of the AMVP, the encoding apparatus may predict a motion vector of a current block by using motion information of neighbor blocks, and transmit (1) information regarding motion information of which neighbor blocks is used, (2) a difference between a motion vector of the current block and a predicted motion vector, (3) a reference picture index indicating a reference picture, and the like, to the decoding apparatus. The decoding apparatus may generate a prediction block with respect to the current block based on the induced motion vector and the reference picture index information received from the encoding apparatus.

Meanwhile, according to the development of communication and video technology, various devices using video information are used based on each different performance. Devices such as mobile phones, or the like, reproduce video having relatively low resolution based on a bit stream. In comparison, devices such as personal computers (PCs), or the like, may be able to reproduce video having relatively high resolution.

Thus, a method for providing an optimum video service to devices having various performances is required to be considered. One of the solutions is scalable video coding (SVC).

In general, in the SVC, a sub-bit stream available for reproducing a valid video image may also be configured by a portion of a video bit stream. Here, the sub-bit stream is a basic stream with respect to corresponding contents, and an image having quality, a size, and/or a frame rate, which are smaller or lower than that of an image reconstructed by the entire bit streams, may be reconstructed by the sub-bit stream.

Figure 4:
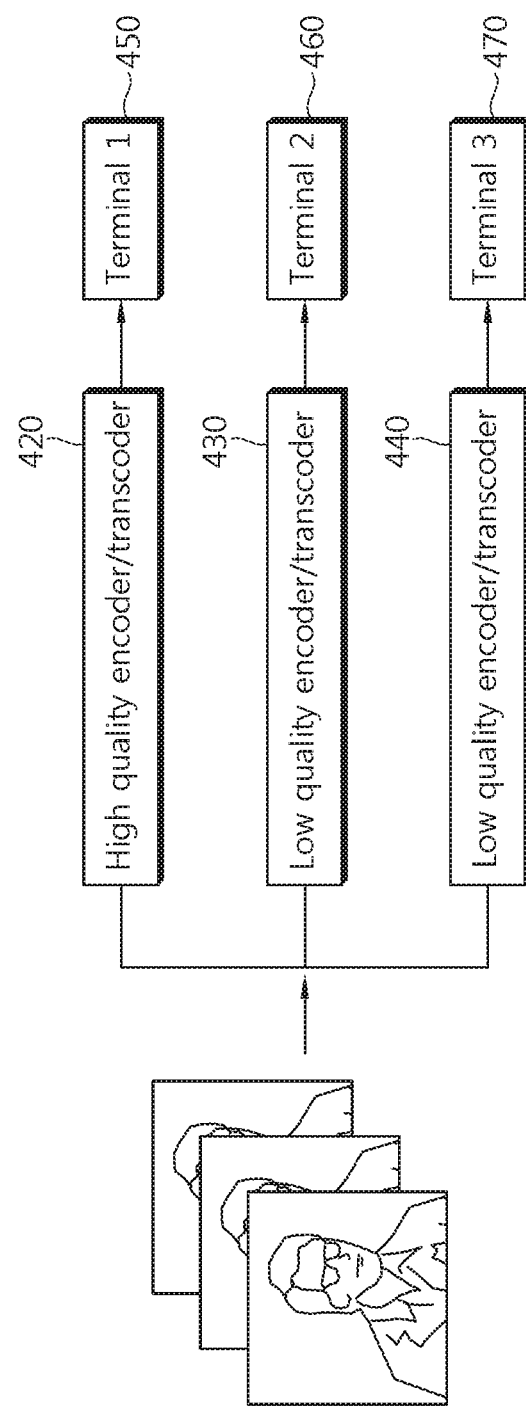
FIG. 4 is a view schematically showing an example of transcoding based on single layer encoding.

FIG. 4 is a view schematically showing an example of transcoding based on single layer encoding. Single layer encoding refers to encoding of a video sequence which does not provide a scalability function.

In the example of FIG. 4, original contents 410 are single layer-encoded by each encoder/transcoder according to quality and resolution. For example, high quality contents are transmitted from a high quality encoder/transcoder 420, low quality contents are transmitted from a low quality encoder/transcoder 430, and contents having low resolution are transmitted from a low resolution encoder/transcoder 440.

A terminal 1 450 which receives and uses high quality contents may be a TV device such as an HD TV, a UHD TV, and the like. A terminal 2 460 which receives and uses low quality contents may have a screen smaller than that of a TV or a low performance PC having an information processing speed slower than that of a TV, and the like. A terminal 3 470 which receives and uses contents having low resolution may be a mobile phone having a smaller screen, or the like. Contents different from those of the foregoing examples may be received and used according to performance of each terminal.

Meanwhile, the encoded bit stream may include a plurality of layers.

Scalable encoding allows a decoder to selectively decode only a portion of a bit stream. The coded bit stream may be arranged as a plurality of layers, which may include a base layer and one or more enhancement layers.

Figure 5:
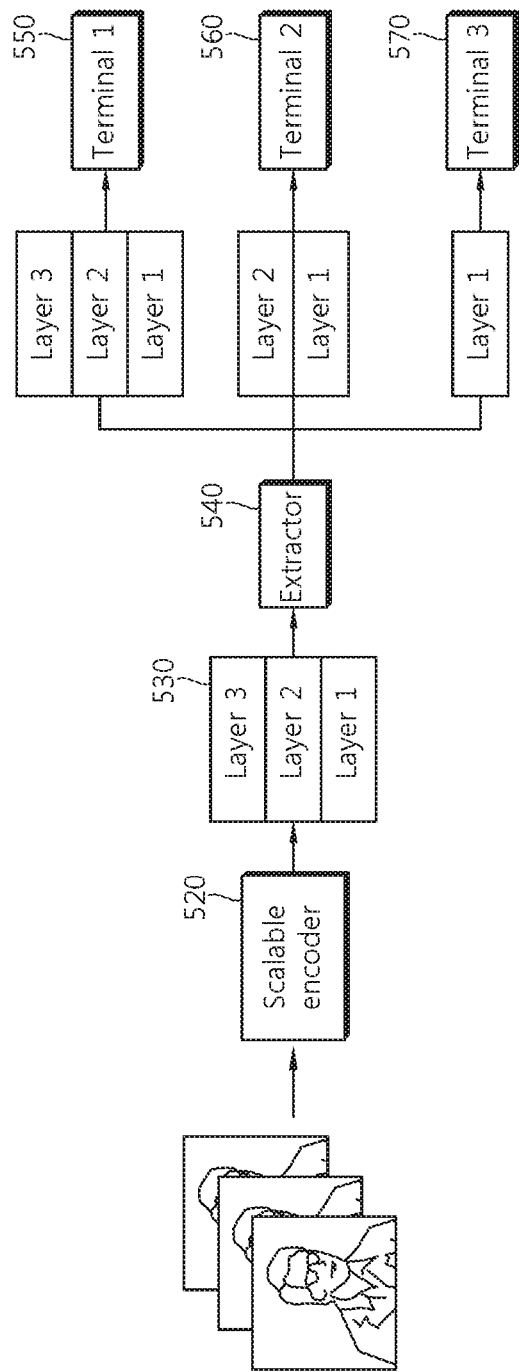
FIG. 5 is a view schematically illustrating an example in which scalable video coding based on multilayer encoding is used as an example of employing SVC.

FIG. 5 is a view schematically illustrating an example in which scalable video coding based on multilayer encoding is used as an example of employing SVC.

Multilayer encoding provides scalability by encoding a video sequence having a plurality of layers. In a scalable system, a layer having video data having the lowest or the basic quality is called a base layer. Also, a layer having video data having higher quality is called an enhancement layer.

General scalability includes temporal scalability, spatial scalability, and quality scalability. The temporal scalability is scalability regarding a frame rate. The spatial scalability is scalability regarding a picture size or resolution. Also, the quality scalability may be related to fidelity of an image.

In the example of FIG. 5, original contents 510 are encoded by a scalable encoder 520.

The scalable encoder 520 supports the foregoing temporal, spatial, and quality scalabilities. The scalable encoder 520 encodes the original contents 510 to generate a bit stream 530 having multiple layers.

The multiple layers of the bit stream 530 may include a base layer including basic image information, and an enhancement layer including information regarding an image having better quality (i.e., accuracy, size, and/or frame rate, etc.) than that of the base layer.

When the decoding apparatus of a terminal receives the base layer and decodes an image, a basic image is decoded. For example, an image having a basic size, basic quality and/or a basic frame rate is decoded.

When the decoding apparatus of the terminal receives the enhancement layer together with the base layer and decodes an image, it may decode an image having a greater size, better quality and/or higher frame rate. For example, in case that the spatial scalability is supported, when the decoding apparatus of the terminal receives and decodes the enhancement layer together with the base layer, it can obtain an image having higher resolution or larger size. In case that the temporal scalability is supported, when the decoding apparatus of the terminal receives and decodes the enhancement layer together with the base layer, it can obtain an image having a higher frame rate. In case that the quality scalability is supported, when the decoding apparatus of the terminal receives and decodes the enhancement layer together with the base layer, it can obtain an image having high fidelity.

With reference to FIG. 5, the scalable encoder 520 outputs the bit stream 530 including a plurality of layers (layer 1, layer 2, layer 3) arranged therein. An extractor 540 extracts a required layer according to a request from each terminal or a network, from the bit stream 530 and transmits the same.

It is assumed that the layer 1 is a base layer. When the terminal 3 570 is a terminal that processes an image having basic quality, such as a cellular phone, or the like, the terminal 3 570 may receive and decode a stream including only the layer 1.

When the terminal 2 560 and the terminal 1 550 are terminals that may be able to process an image having high quality, such as a TV, a PC, or the like, the terminal 2 560 and the terminal 1 550 may receive and decode at least one of the enhancement layers (layer 2 and layer 3) together with the base layer (layer 1) according to supported performance and a desired image type.

A method of determining or predicting a data value of an enhancement layer by using a lower layer (reference layer) is called interlayer prediction. Here, a layer used as a base of prediction is called a reference layer.

In the interlayer prediction, information regarding the enhancement layer is predicted by utilizing information regarding the lower layer such as the base layer to the maximum level. Thus, an amount of information transmitted or processed for the prediction of the enhancement layer can be considerably reduced. For example, when picture sizes processed in a lower layer and a higher layer are different, information of a reconstructed layer is upsampled to be used to reconstruct information of the higher layer, e.g., the enhancement layer.

The interlayer prediction method includes an interlayer texture, an interlayer motion prediction, an interlayer residual prediction, and the like.

Figure 6:
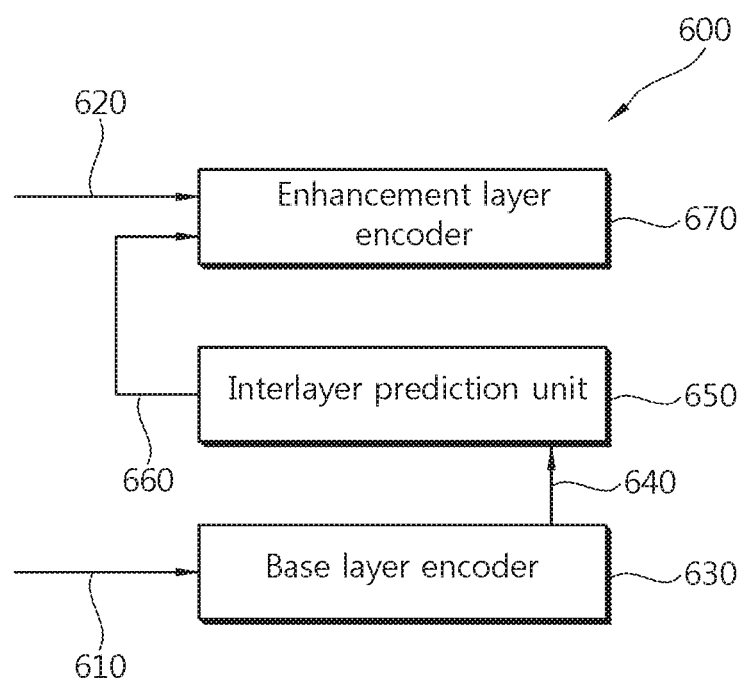
FIG. 6 is a view schematically illustrating an example of an encoding apparatus employing SVC.

FIG. 6 is a view schematically illustrating an example of an encoding apparatus employing SVC. With reference to FIG. 6, an SVC encoding apparatus 600 includes a base layer encoder 630, an interlayer prediction unit 650, and an enhancement layer encoder 670.

Video streams 610 and 620 for encoding a corresponding layer are input to the base layer encoder 630 and the enhancement layer encoder 670, respectively. The video stream 610 having low resolution is input to the base layer encoder 630, and the video stream 620 having high resolution is input to the enhancement layer encoder 670.

The base layer encoder 630 may perform encoding on the base layer according to the encoding method as described above with reference to FIG. 1. Information regarding the encoding performed by the base layer encoder 630 is delivered (640) to the interlayer prediction unit 650.

As described above, the interlayer prediction unit 650 may upsample the video information reconstructed by the base layer encoder 630 and deliver (660) the same to the enhancement layer encoder 670. Here, the interlayer prediction unit 650 may perform deblocking filtering on the video reconstructed by the base layer encoder 630 and transfer the same to the enhancement layer encoder 670.

In case that a block referred to in the base layer has been intra-predicted, the information regarding the base layer delivered through the interlayer prediction unit 650 may be a pixel value to be used for intra-prediction, and in case that the block referred to in the base layer has been inter-predicted, the information regarding the base layer delivered through the interlayer prediction unit 650 may be motion information and residual information to be used for inter-prediction.

The enhancement layer encoder 670 may also perform encoding on the enhancement layer according to the encoding method as described above with reference to FIG. 1. However, the enhancement layer encoder 670 may perform encoding on the enhancement layer based on video sequence information having high resolution and information regarding a base layer delivered from the interlayer prediction unit 650.

Upsampling based on the information regarding the base layer may be performed by the enhancement layer encoder 670 or by the interlayer prediction unit 650.

Here, it has been described that the video stream input to the base layer encoder 630 is a video stream having low resolution and the video stream input to the enhancement layer encoder 670 is a video stream having high resolution. However, the present invention is not limited thereto and the video stream input to the base layer encoder 630 may be a video stream having high quality in terms of resolution, fidelity, and/or frame rate, or the like, and the video stream input to the enhancement layer encoder 670 may be a video stream having low quality or base quality in terms of resolution, fidelity, and/or frame rate, or the like.

Figure 7:
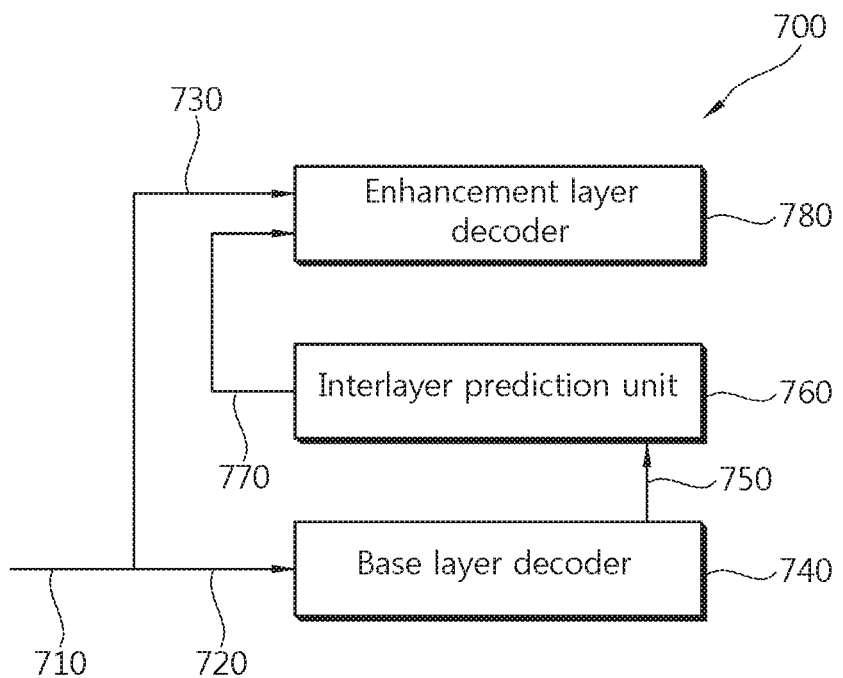
FIG. 7 is a view schematically illustrating an example of a decoding apparatus employing SVC.

FIG. 7 is a view schematically illustrating an example of a decoding apparatus employing SVC. With reference to FIG. 7, an SVC decoding apparatus 700 includes a base layer decoder 740, an interlayer prediction unit 760, and an enhancement layer decoder 780.

A bit stream 710 transmitted from an encoding apparatus includes a bit stream 720 having video information having low resolution, as a bit stream with respect to the base layer decoder 740, and a bit stream 730 having video information having high resolution, as a bit stream with respect to the enhancement layer decoder 780.

The bit streams 720 and 730 for decoding a corresponding layer are input to the base layer decoder 740 and the enhancement layer decoder 780, respectively. Namely, the bit stream 720 with respect to a video having low resolution is input to the base layer decoder 740, and the bit stream 730 with respect to a video having high resolution is input to the enhancement layer decoder 780.

The base layer decoder 740 may perform decoding on a base layer according to the method described above with reference to FIG. 2. Base layer video information reconstructed by the base layer decoder 740 is delivered (750) to the interlayer prediction unit 760.

As described above, the interlayer prediction unit 760 may upsample the video information reconstructed by the base layer decoder 740 and deliver (770) the same to the enhancement layer decoder 780. Here, the interlayer prediction unit 760 may perform deblocking filtering on the video reconstructed by the base layer decoder 740 and deliver the same to the enhancement layer decoder 780.

In case that a block referred to in the base layer has been intra-predicted, the information regarding the base layer delivered through the interlayer prediction unit 760 may be a pixel value to be used for intra-prediction, and in case that the block referred to in the base layer has been inter-predicted, the information regarding the base layer delivered through the interlayer prediction unit 760 may be motion information and residual information to be used for inter-prediction.

The enhancement layer 780 may also perform decoding on the base layer according to the decoding method as described above with reference to FIG. 2. However, the enhancement layer 780 may perform decoding on the enhancement layer based on the information regarding the base layer delivered from the interlayer prediction unit 760 and the video sequence information having high resolution.

Upsampling based on the information regarding the base layer may be performed by the enhancement layer decoder 780 or by the interlayer prediction unit 760.

Here, it has been described that the video stream input to the base layer decoder 740 is a video stream having low resolution and the video stream input to the enhancement layer decoder 780 is a video stream having high resolution. However, the present invention is not limited thereto and the video stream input to the base layer decoder 740 may be a video stream having high quality in terms of resolution, fidelity, and/or frame rate, or the like, and the video stream input to the enhancement layer decoder 780 may be a video stream having low quality or base quality in terms of resolution, fidelity, and/or frame rate, or the like.

In FIGS. 6 and 7, the example in which the layers are configured as the base layer and the enhancement layer has been described, but the method and apparatus described in the present disclosure are not limited thereto and may be applicable to a case in which the enhancement layer is comprised of a higher layer and a lower layer as a plurality of measurement layers. In this case, an encoding apparatus and a decoding apparatus with respect to the higher layer may perform encoding and decoding on the higher layer based on information regarding the lower layer.

In FIGS. 6 and 7, it has been described that as the information delivered from the base layer encoder and the base layer decoder to the interlayer prediction unit and as the information delivered from the interlayer prediction unit to the enhancement layer encoder and the enhancement layer decoder, single information is transmitted. This is for the convenience of explanation, and in the case of FIG. 6, information for supporting particular scalability may be delivered between processing units supporting the corresponding scalability within the base layer encoder, the interlayer prediction unit, the enhancement layer encoder according to supported scalability. For example, within the base layer encoder, the interlayer prediction unit, the enhancement layer encoder of FIG. 6, information for processing temporal scalability is transmitted and received between units that process temporal scalability, information for processing spatial scalability is transmitted and received between units that process spatial scalability, and information for processing quality scalability is transmitted and received between units that process quality scalability. A portion or the entirety of each information may be transmitted to a unit that collects information or integrally processes information, and each information may be collectively or individually transmitted from the unit that collects information or integrally processes information.

Also, in the case of FIG. 7, information for supporting particular scalability may be delivered between processing units supporting the corresponding scalability within the base layer decoder, the interlayer prediction unit, the enhancement layer decoder according to supported scalability. For example, within the base layer decoder, the interlayer prediction unit, the enhancement layer decoder of FIG. 7, information for processing temporal scalability is transmitted and received between units that process temporal scalability, information for processing spatial scalability is transmitted and received between units that process spatial scalability, and information for processing quality scalability is transmitted and received between units that process quality scalability. A portion or the entirety of each information may be transmitted to a unit that collects information or integrally processes information, and each information may be collectively or individually transmitted from the unit that collects information or integrally processes information.

Meanwhile, the interlayer prediction includes a single loop prediction method and a multi-loop prediction method.

In the case of the single loop prediction method, in decoding an encoded multilayer bit stream, the encoding apparatus/decoding apparatus does not completely decode reference-available layers among lower layers excluding a current layer to be decoded (or as a target of decoding). The encoding apparatus/decoding apparatus decodes and uses only coding information (motion information, intra-mode information) of a lower layer (reference layer) that may be referred to for decoding a decoding target block (current block) or a decoding target picture (current picture) of a current layer and a residual signal (residual information). Here, the coding information decoded so as to be referred to may include motion information such as a motion vector (VM), a reference picture index, a motion information prediction candidate index, a motion information integrated candidate index, and an inter-prediction mode.

In the case of the multi-loop prediction method, in decoding an encoded multilayer bit stream, the encoding apparatus/decoding apparatus completely decode reference-available layers among lower layers including a current layer to be decoded (or a current layer as a target of decoding). The encoding apparatus/decoding apparatus completely decodes reference-available lower layers based on texture information obtained by completely decoding reference layer(s), and decodes a decoding target block (current block) or the decoding target picture (current picture) of the current layer based on the decoded information.

The use of the multi-loop prediction method drastically increases complexity since all the lower layers that can be referred to are reconstructed to perform prediction on the current layer.

The use of the single loop prediction method, complexity is reduced but available information or available interlayer prediction is limited. In the case of interlayer intra-prediction employing the single loop scheme, a current block may be interlayer-predicted by decoding coding information of a co-located block of a current block located at a lower layer (reference layer). Meanwhile, in the case of employing the single loop scheme in order to reduce complexity, it is difficult to decode all the reference pictures required for predicting the current block in each layer. Thus, interlayer prediction is performed on the current layer by using only certain coding information (a motion vector, a reference picture index, an AMVP candidate index, a merge candidate index, an intra-prediction mode, etc.) and a residual signal.

For example, in the single loop type interlayer prediction, a motion estimation (ME) is not performed on the current block, and an estimation may be performed on the current block based on motion information (a motion vector, residual information, a reference picture index, an AMVP candidate index, a merge candidate index, etc.) of a co-located block within a picture corresponding to a current picture. Here, the encoding apparatus may select the utmost mode in consideration of Rate Distortion Optimization (RDO).

Interlayer prediction using the single loop prediction method will be described in detail with reference to the accompanying drawings.

Figure 8:
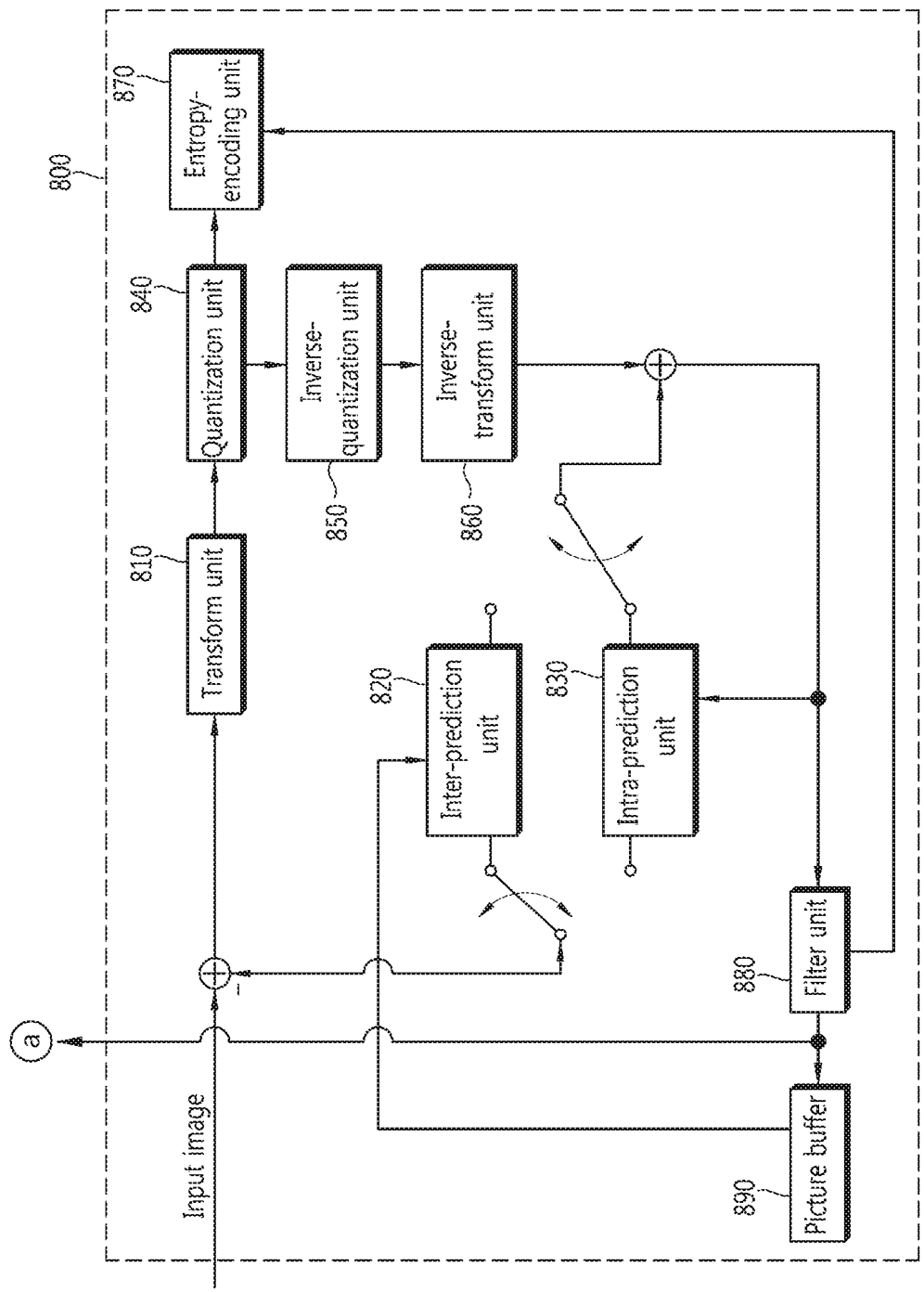
FIG. 8 is a view schematically illustrating a multilayer encoding apparatus for performing interlayer prediction according to an embodiment of the present invention.

FIG. 8 is a view schematically illustrating a multilayer encoding apparatus for performing interlayer prediction according to an embodiment of the present invention. In FIG. 8, an example of an encoding apparatus with respect to a base layer in the multi-layer encoding apparatus is illustrated.

A transform unit 810, an inter-prediction unit 820, an intra-prediction unit 830, a quantization unit 840, an inverse-quantization unit 850, an inverse-transform unit 860, an entropy-encoding unit 870, a filter unit 880, and a picture buffer 890 of FIG. 8 may serve as the respective components of the encoding apparatus as described above with reference to FIG. 1.

For example, the transform unit 810 may perform DST or discrete cosine transform (DCT) on an input image and a difference value of pixels, i.e., a residual signal (residual block), predicted by the inter-prediction unit 820 or the intra-prediction unit 830. The quantization unit 840 quantizes the difference value of the pixels which have been DST or DCT, i.e., the residual signal (residual block). The inverse-quantization unit 850 inversely quantizes the value quantized by the quantization unit 840. The inverse-transform unit 860 inversely transforms the inversely quantized value through IDCT (Inverse DCT) or IDST (Inverse DST). The entropy-encoding unit 870 entropy-encodes the value quantized by the quantization unit 840 by using CABAC, CAVLC, or the like.

When the encoding apparatus 800 performs encoding in the inter-mode, the inter-prediction unit 820 performs prediction (inter-prediction) on a current block based on a reference picture stored in the picture buffer 890. When the encoding apparatus 800 performs encoding in the intra-mode, the intra-prediction unit 830 performs prediction (intra-prediction0 on the current block based on neighbor blocks within a current picture. Details of the inter-prediction performed by the inter-prediction unit and the intra-prediction performed by the intra-prediction unit have been described above with reference to FIG. 1.

The picture buffer 890 stores a decoded image, and the filter unit 880 may apply an in-loop filter to the image before the image is stored in the picture buffer 890.

With reference to FIG. 8, image information processed in the encoding apparatus 800 with respect to a base layer is transmitted to the interlayer prediction unit. For example, image information ⓐ output from the intra-prediction unit 830, image information ⓒ output from the inter-prediction unit 820, and information ⓓ inversely transformed by the inverse-transform unit 860 are delivered to the interlayer prediction unit. Image information ⓑ reconstructed after being decoded may pass through at least one of in-loop filters (deblocking filter, SAO, ALF, etc., in the filter unit 880, and then, may be delivered to the interlayer prediction unit. In this case, the image information ⓑ may also be delivered to the interlayer prediction unit without passing through an in-loop filter.

Figure 9:
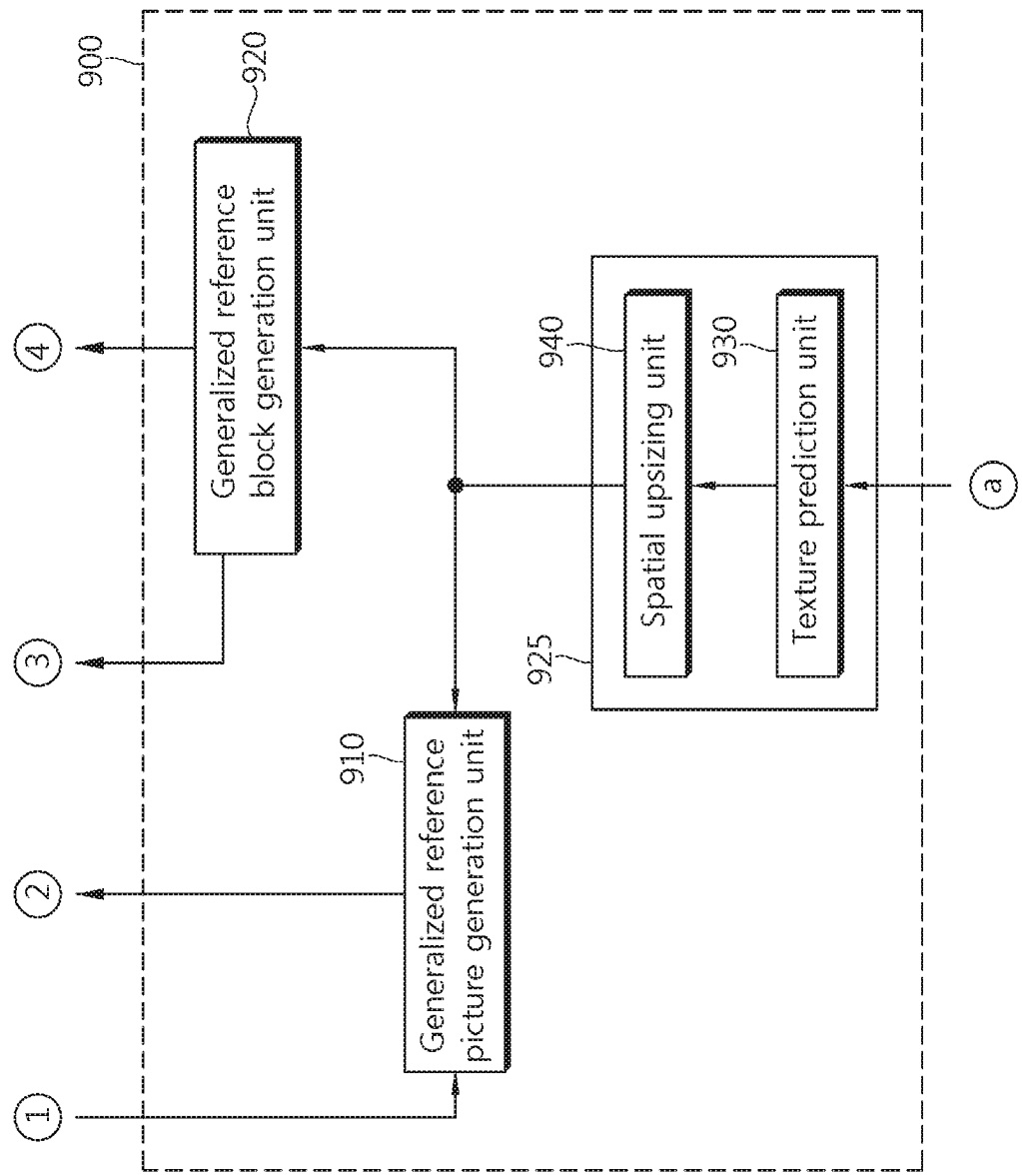
FIG. 9 is a view schematically illustrating a multilayer encoding apparatus for performing interlayer prediction according to an embodiment of the present invention.

FIG. 9 is a view schematically illustrating a multilayer encoding apparatus for performing interlayer prediction according to an embodiment of the present invention. In FIG. 9, an example of the interlayer prediction unit of the multilayer encoding apparatus is illustrated.

An interlayer prediction unit 900 includes a generalized reference picture generation unit 910, a generalized reference block generation unit 920, and a prediction unit 925. The prediction unit 925 may include a texture prediction unit 930, a spatial upsizing unit 940, a motion estimation unit 950, a scale upsizing unit 960, a residual prediction unit 970, and a spatial upsizing unit 980.

Image information ⓐ, ⓑ, ⓒ, ⓓ illustrated in FIG. 9, as information input to the interlayer prediction unit 900, are the same as ⓐ, ⓑ, ⓒ, ⓓ illustrated in FIG. 8, as information transmitted from the base layer encoding apparatus.

The interlayer prediction unit generates prediction information required for interlayer prediction based on the input information ⓐ, ⓑ, ⓒ, ⓓ.

In detail, the texture prediction unit 930 may obtain decoded texture information of reference layer blocks corresponding to an encoding target block of an enhancement layer (current layer) through texture prediction based on the image information ⓑ transferred from the base layer encoding apparatus. Texture prediction is a process of obtaining a pixel value from a block of a reference layer (base layer) corresponding to a current block of an enhancement layer (current layer).

The spatial upsizing unit 940 may upsize (e.g., upsampling) the decoded texture information of the reference layer blocks obtained from the texture prediction unit 930 according to a size of the enhancement layer (current layer).

The motion prediction unit 950 may obtain intra-prediction mode and motion information of the reference layer blocks corresponding to the encoding target block of the enhancement layer (current layer) based on the information ⓒ transferred from the base layer encoding apparatus.

The scale upsizing unit 960 may adjust the motion information of the reference layer blocks obtained from the motion prediction unit 950 correspondingly in relation to the enhancement layer (current layer). For example, a motion vector obtained from the motion estimation unit 950 may be scaled according to a size of the enhancement layer. The AMWP candidate, merge candidate, or the like, may be mapped to corresponding AMVP candidate or merge candidate in the enhancement layer.

The residual prediction unit 970 may obtain residual information of the reference layer blocks corresponding to an encoding target block of the enhancement layer (current layer) based on the image information ⓓ transferred from the base layer encoding apparatus.

The spatial upsizing unit 980 may upsize (e.g., upsampling) the residual information of the reference layer obtained from the residual prediction unit 970 according to the size of the enhancement layer.

The generalized reference picture generation unit 910 generates a generalized reference picture based on the image information of the base layer generated by the prediction unit 925, the image information ⓐ of the decoded base layer transferred from the picture buffer of the base layer encoding apparatus, and the image information ① of the decoded enhancement layer transferred from the picture buffer of the enhancement layer encoding apparatus. As described above, the prediction unit 925 delivers the texture information, the motion information, the intra-prediction mode information, and the residual information obtained from the base layer to the generalized reference picture generation unit 910.

The generalized reference block generation unit 920 generates a generalized reference block based on the image information of the base layer generated from the prediction unit 925 and the image information ⓐ of the decoded base layer transferred from the picture buffer of the base layer encoding apparatus. As described above, the prediction unit 925 transfers the texture information, the motion information, the intra prediction mode information, and the residual information obtained from the base layer to the generalized reference block generation unit 920.

Here, the information transferred from the generalized reference picture generation unit 910 and the generalized reference block generation unit 920 may be scaled or upsized according to the characteristics of the enhancement layer.

The generalized reference picture or generalized reference block may be generated by reflecting a slice type of the reference layer.

For example, when the reference layer is I-slice, the generalized reference picture generation unit or generalized reference block generation unit may generate texture by reconstructing the reference layer.

Also, when the reference layer is a P-slice or B-slice and a block of the reference layer is inter-predicted, the generalized reference picture generation unit or the generalized reference block generation unit may generate a prediction signal by using motion information and reference images of the enhancement layer.

When the block of the reference layer is intra-predicted, the generalized reference picture generation unit or the generalized reference block generation unit may perform intra-prediction by using the corresponding intra-prediction mode. In this case, as neighbor reference samples used for intra-prediction, reconstruction samples of the inter-predicted block in the enhancement layer (current layer) may be used.

The thusly generated prediction signals may be used a generalized reference picture/block. Also, an upsampled residual signal of the reference layer may be added to the thusly generated prediction signals so as to be used as a generalized reference picture or reference block.

In detail, a generalized reference picture in case that the single loop scheme is applied in the interlayer prediction is a picture comprised of prediction signals obtained from the motion information of reference layers when the reference layers are the P-slice and the B-slice and a reference picture with respect to an encoding target picture of the enhancement layer (current layer) through motion compensation. Here, when there is an intra-predicted reference block in the reference layer, the reference block, the reference block may be included in configuring a generalized reference picture through intra-prediction in which (1) neighbor prediction signals of the reference block obtained through the motion compensation are used as reference samples or (2) neighbor samples of the reference sample are used as reference samples in the enhancement layer, in the same prediction mode as the intra-prediction mode applied to the corresponding block in the reference layer.

Meanwhile, a picture obtained by further performing picture enhancement on a picture comprised of the prediction signals may be used as a generalized reference picture. A signal obtained by adding residual information of the reference layer to a prediction signal obtained through motion compensation may be used as a generalized reference picture. Also, a picture comprised of the prediction signals or a picture obtained by performing picture enhancement on a picture comprised of signals obtained by adding residual information to a prediction signal may be used as a reference picture.

When the single loop scheme is applied in the inter-layer prediction and a reference layer the I-slice, a texture signal obtained from the reference layer may be used as a generalized reference picture. Also, a signal obtained by performing picture enhancement on the texture signal obtained from the reference layer may also be used as a generalized reference picture.

The generalized reference picture may be added to a reference picture list with respect to a current encoding target picture (block) of the enhancement layer (current layer) so as to be used for inter-prediction of the encoding target picture (block). Also, the generalized reference picture may be designated as a reference picture with respect to the encoding target picture (block) of the enhancement layer (current layer) so as to be used, rather than being added to the reference picture list.

A generalized reference block in case that the single loop scheme is applied in the interlayer prediction is a block comprised of prediction signals obtained from the motion information of reference layers when the reference layers are the P-slice and the B-slice and a reference picture with respect to an encoding target picture of the enhancement layer (current layer) through motion compensation. Here, when there is an intra-predicted reference block in the reference layer, the reference block, the reference block may be included in configuring a generalized reference picture through intra-prediction in which 1) neighbor prediction signals of the reference block obtained through the motion compensation are used as reference samples or 2) neighbor samples of the reference sample are used as reference samples in the enhancement layer, in the same prediction mode as the intra-prediction mode applied to the corresponding block in the reference layer.

Meanwhile, a block obtained by further performing picture enhancement on a block comprised of the prediction signals may be used as a generalized reference block. A block obtained by adding residual information of the reference layer to a prediction signal obtained through motion compensation may be used as a generalized reference block.

In addition, a block comprised of the prediction signals or a block obtained by performing picture enhancement on a block obtained by adding residual information to a prediction signal may be used as a reference block.

When the single loop scheme is applied in the inter-layer prediction and a reference layer the I-slice, a texture signal obtained from the reference layer may be used as a generalized reference block. Also, a signal obtained by performing picture enhancement on the texture signal obtained from the reference layer may also be used as a generalized reference block.

The generalized reference block may be used as a prediction signal with respect to an encoding target block of the enhancement layer (current layer). When a size of the encoding target block of the current layer is N×N, the generalized reference block generation unit 920 may obtain the block having the size of N×N generated from the picture of the decoded reference layer, as a generalized reference block. The encoding apparatus of the enhancement layer may encode a difference (residual signal) with an original block of the enhancement layer by using the generalized reference block as a prediction block with respect to the current block.

The generalized reference picture information ② generated by the generalized reference picture generation unit 910 and the generalized reference block information ③ and ④ generated by the generalized reference clock generation unit 920 are transferred to the enhancement layer encoding apparatus. The reference block information ③ and ④ output from the generalized reference block generation unit 920 may be the same information.

Figure 10:
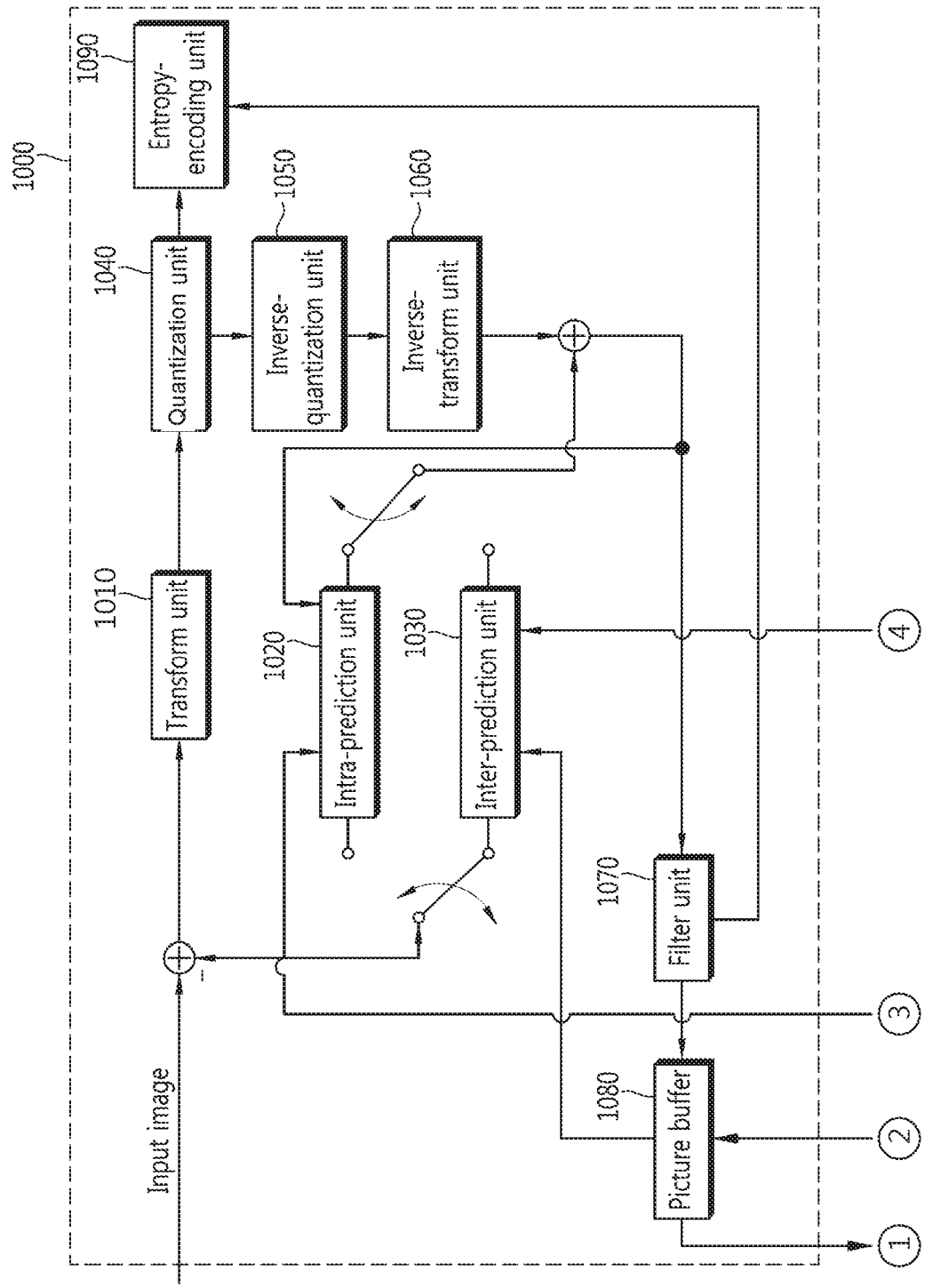
FIG. 10 is a view schematically illustrating a multilayer encoding apparatus for performing interlayer prediction according to an embodiment of the present invention.

FIG. 10 is a view schematically illustrating a multilayer encoding apparatus for performing interlayer prediction according to an embodiment of the present invention. In FIG. 10, an example of an enhancement layer encoding apparatus in the multilayer encoding apparatus is illustrated.

An enhancement layer encoding apparatus 1000 includes a transform unit 1010, an intra-prediction unit 1020, an inter-prediction unit 1030, a quantization unit 1040, an inverse-quantization unit 1050, an inverse-transform unit 1060, a filter unit 1070, a picture buffer 1080, and an entropy-encoding unit 1090.

The transform unit 1010, the inter-prediction unit 1020, the intra-prediction unit 1030, the quantization unit 1040, the inverse-quantization unit 1050, the inverse-transform unit 1060, the filter unit 1070, and the picture buffer 1080, and the entropy-encoding unit 1090 of FIG. 10 may serve as the respective components of the encoding apparatus as described above with reference to FIG. 8.

For example, the transform unit 1010 may perform DST or discrete cosine transform (DCT) on an input image and a difference value of pixels, i.e., a residual signal (residual block), predicted by the inter-prediction unit 1020 or the intra-prediction unit 1030. The input image input to the enhancement layer encoding apparatus 1000 may be an image stream comprised of a portion or the entirety of the whole image stream, as information regarding an image having higher picture quality, larger size, higher resolution and/or higher frame rate than those of the input image input to the base layer encoding apparatus 800. The quantization unit 1040 quantizes the difference value of the pixels which have been DST or DCT, i.e., the residual signal (residual block). The inverse-quantization unit 1050 inversely quantizes the value quantized by the quantization unit 1040. The inverse-transform unit 1060 inversely transforms the inversely quantized value through IDCT (Inverse DCT) or IDST (Inverse DST). The entropy-encoding unit 1090 entropy-encodes the value quantized by the quantization unit 1040 by using CABAC, CAVLC, or the like.

The picture buffer 1080 stores a decoded image, and the filter unit 1070 may apply an in-loop filter to the image before the image is stored in the picture buffer 1080.

When the encoding apparatus 1000 performs encoding in the intra-mode, the intra-prediction unit 1020 performs prediction (intra-prediction0 on the current block based on neighbor blocks within a current picture. When the encoding apparatus 1000 performs encoding in the inter-mode, the inter-prediction unit 1030 performs prediction (inter-prediction) on a current block based on a reference picture. Details of the inter-prediction performed by the inter-prediction unit and the intra-prediction performed by the intra-prediction unit have been described above with reference to FIG. 1.

With reference to FIG. 10, image information processed in the encoding apparatus with respect to the base layer is transmitted to the encoding apparatus 1000 with respect to the enhancement layer through the interlayer prediction unit. For example, information ② regarding a generalized reference picture generated by the generalized reference picture generation unit of the interlayer prediction unit is transferred to the picture buffer 1080. Information ③ and ④ regarding the generalized reference block generated by the generalized reference block generation unit of the interlayer prediction unit is transferred to the intra-prediction unit 1020 and the inter-prediction unit 1030.

As illustrated, the intra-prediction unit 1020 may use the image information ③ of the base layer transmitted from the interlayer prediction unit, as a prediction signal with respect to a current block of the enhancement layer. Also, the intra-prediction unit 1020 may perform intra-prediction on the current block of the enhancement layer by using neighbor reference samples of the enhancement layer.

As illustrated, the inter-prediction unit 1030 may use image information ④ of the base layer transmitted from the interlayer prediction unit, as a prediction signal with respect to the current block of the enhancement layer. The inter-prediction unit 1030 may perform a motion estimation by using the image information ② of the base layer stored in the picture buffer 1080.

Here, it has been described that the inter-prediction unit 1030 that performs inter-prediction on the input image of the enhancement layer and the intra-prediction unit 1020 that performs even intra-prediction on the input image of the enhancement layer perform prediction based on the information transferred from the interlayer prediction unit in the enhancement layer encoding apparatus 1000, but the present invention is not limited thereto. For example, the enhancement layer encoding apparatus may include an extra prediction unit, apart from the inter-prediction unit 1030 and/or the intra-prediction unit 1020, and the extra prediction unit may perform prediction based on the information ③ and ④ transmitted from the interlayer prediction unit. In this case, information input to or output from the inter-prediction unit 1030, the intra-prediction unit 1020, and the extra prediction unit may be selected by installing a switch.

Figure 11:
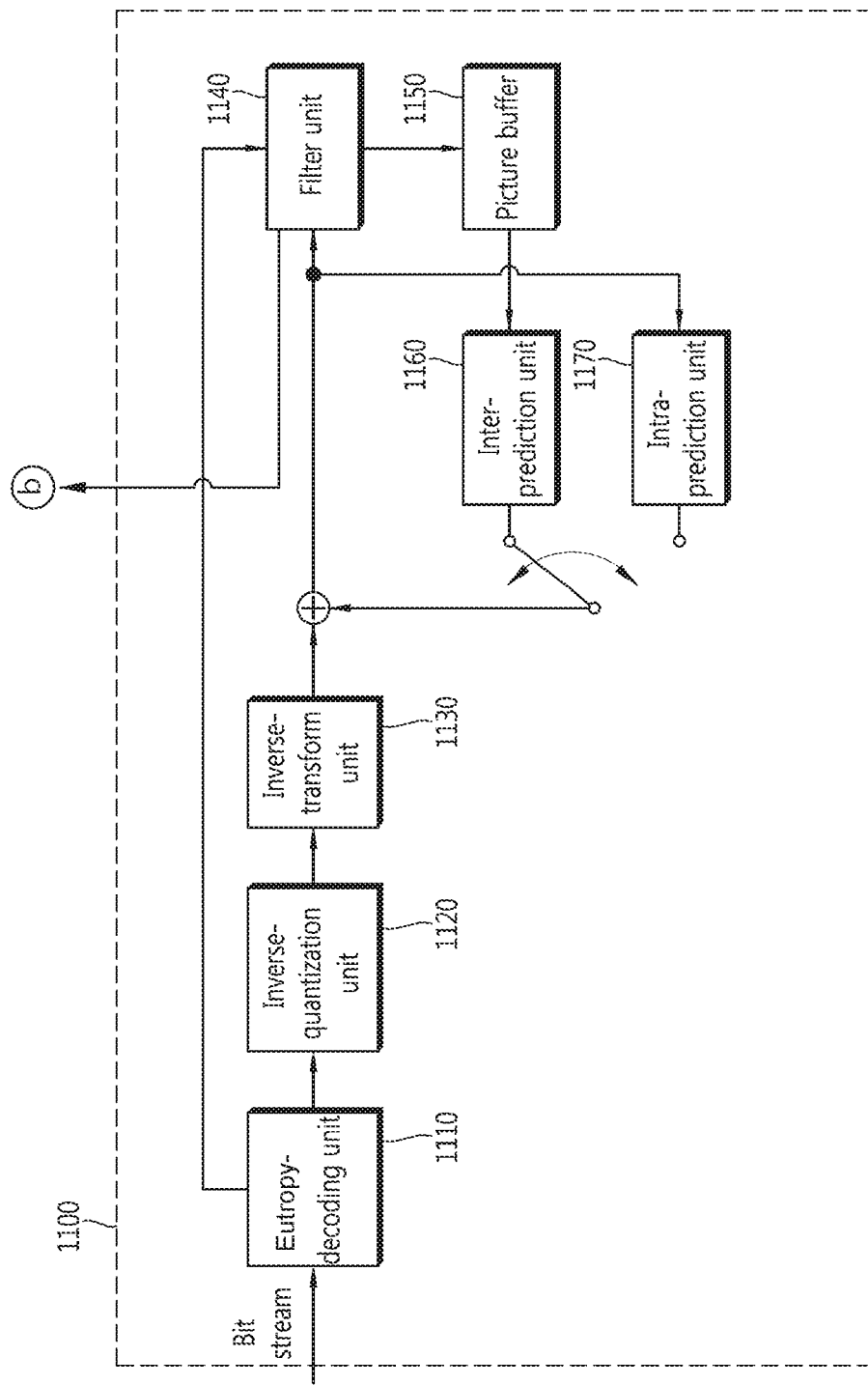
FIG. 11 is a view schematically illustrating a multilayer decoding apparatus for performing interlayer prediction according to an embodiment of the present invention.

FIG. 11 is a view schematically illustrating a multilayer decoding apparatus for performing interlayer prediction according to an embodiment of the present invention. In FIG. 11, an example of a base layer decoding apparatus in the multilayer decoding apparatus is illustrated.

With reference to FIG. 11, a base layer decoding apparatus 1100 includes an entropy-decoding unit 1110, an inverse-quantization unit 1120, an inverse-transform unit 1130, a filter unit 1140, a picture buffer 1150, an inter-prediction unit 1160, and an intra-prediction unit 1170.

The entropy-decoding unit 1110, the inverse-quantization unit 1120, the inverse-transform unit 1130, the filter unit 1140, the picture buffer 1150, the inter-prediction unit 1160, and the intra-prediction unit 1170 may serve as the respective components of the decoding apparatus as described above with reference to FIG. 2.

For example, the entropy-decoding unit 1110 may receive a bit stream and perform entropy-decoding thereon through a method such as CABAC, CAVLC, or the like. The inverse-quantization unit 1120 may inversely quantize a quantized transform coefficient obtained from the entropy-decoding unit 1110. The inverse-transform unit 1130 performs inverse-quantization according to a transforming method applied to the quantized transform coefficient. For example, when the quantized transform coefficient is based on DCT, the inverse-transform unit 1130 may perform inverse-quantization by using IDCT, and when the quantized transform coefficient is based on DST, the inverse-transform unit 1130 may perform inverse-quantization by using IDST.

The picture buffer unit 1150 may store decoded image information, and the filter unit 1140 may apply an in-loop filter to the reconstructed image (picture) before being stored in the picture buffer 1150.

When the decoding apparatus 1100 performs inter-prediction on a current block, the inter-prediction unit 1160 performs inter-prediction based on a reference picture stored in the picture buffer unit 1150. When the decoding apparatus 1100 performs intra-prediction on a current block, the intra-prediction unit 1170 performs intra-prediction on the current block based on information regarding a neighbor block. Details of the inter-prediction and intra-prediction are the same as described above.

With reference to FIG. 11, the image information processed in the decoding apparatus 1100 with respect to the base layer is transmitted to the interlayer prediction unit. For example, image information ⓗ output from the intra-prediction unit 1170, image information ⓕ output from the inter-prediction unit 1160, and information ⓖ inversely transformed by the inverse-transform unit 1130 are transferred to the interlayer prediction unit. Image information ⓔ which has been decoded and reconstructed may pass through at least one of in-loop filters (the deblocking filter, the SAO, the ALF, etc.) in the filter unit 880, and then, be transferred to the interlayer prediction unit. Here, the image information ⓔ may be transferred to the interlayer prediction unit without passing through an in-loop filter.

Figure 12:
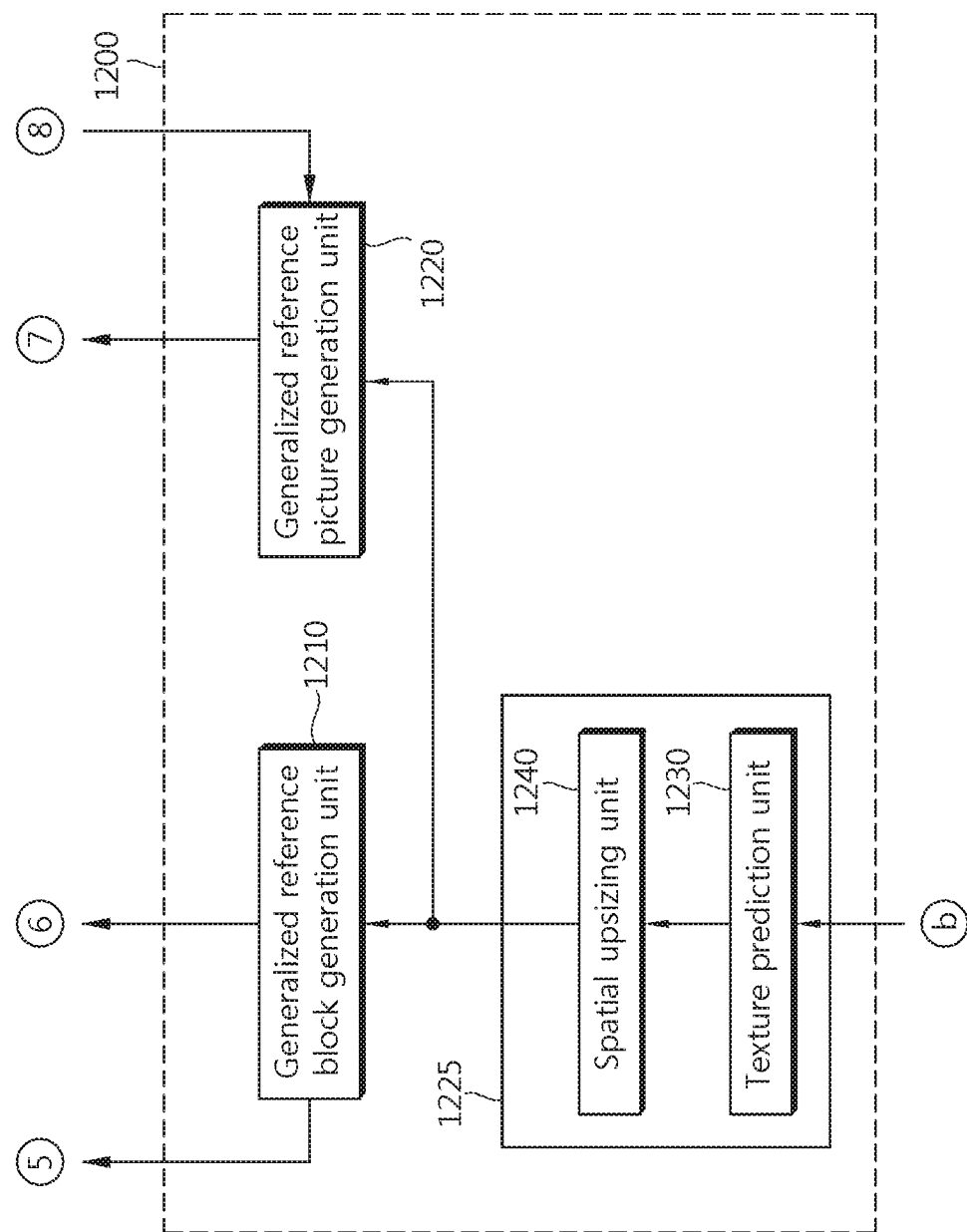
FIG. 12 is a view schematically illustrating a multilayer decoding apparatus for performing interlayer prediction according to an embodiment of the present invention.

FIG. 12 is a view schematically illustrating a multilayer decoding apparatus for performing interlayer prediction according to an embodiment of the present invention. In FIG. 12, an example of the interlayer prediction unit in the multilayer decoding apparatus is illustrated.

The interlayer prediction unit 1200 of the multilayer decoding apparatus includes a generalized reference block generation unit 1210, a generalized reference picture generation unit 1220, and a prediction unit 1225. The prediction unit 1225 may include a texture prediction unit 1230, a spatial upsizing unit 1240, a motion estimation unit 1250, a scale upsizing unit 1260, a residual prediction unit 1270, and a spatial upsizing unit 1280.

Image information ⓔ, ⓕ, ⓖ, ⓗ illustrated in FIG. 12, as information input to the interlayer prediction unit 900, are the same as ⓔ, ⓕ, ⓖ, ⓗ illustrated in FIG. 11, as information transmitted from the base layer decoding apparatus.

The interlayer prediction unit generates prediction information required for interlayer prediction based on the input information ⓔ, ⓕ, ⓖ, ⓗ.

In detail, the texture prediction unit 1230 may obtain decoded texture information of reference layer blocks corresponding to a decoding target block of an enhancement layer (current layer) through texture prediction based on the image information ⓔ transferred from the base layer encoding apparatus. Texture prediction is a process of obtaining a pixel value from a block of a reference layer (base layer) corresponding to a current block of an enhancement layer (current layer).

The spatial upsizing unit 1240 may upsize (e.g., upsampling) the decoded texture information of the reference layer blocks obtained from the texture prediction unit 930 according to a size of the enhancement layer (current layer).

The motion prediction unit 1250 may obtain intra-prediction mode and motion information of the reference layer blocks corresponding to the encoding target block of the enhancement layer (current layer) based on the information ⓕ transferred from the base layer encoding apparatus.

The scale upsizing unit 1260 may adjust the motion information of the reference layer blocks obtained from the motion prediction unit 950 correspondingly in relation to the enhancement layer (current layer). For example, a motion vector obtained from the motion estimation unit 950 may be scaled according to a size of the enhancement layer. The AMWP candidate, merge candidate, or the like, may be mapped to corresponding AMVP candidate or merge candidate in the enhancement layer.

The residual prediction unit 1270 may obtain residual information of the reference layer blocks corresponding to a decoding target block of the enhancement layer (current layer) based on the image information ⓖ transferred from the base layer decoding apparatus.

The spatial upsizing unit 1280 may upsize (e.g., upsampling) the residual information of the reference layer obtained from the residual prediction unit 970 according to the size of the enhancement layer.

The generalized reference picture generation unit 1210 generates a generalized reference block based on the image information of the base layer generated by the prediction unit 1225 and the image information ⓗ of the decoded base layer transferred from the picture buffer of the base layer decoding apparatus. As described above, the prediction unit 1225 delivers the texture information, the motion information, the intra-prediction mode information, and the residual information obtained from the base layer to the generalized reference block generation unit 1210.

The generalized reference picture generation unit 1220 generates a generalized reference picture based on the image information of the base layer generated from the prediction unit 1225, the image information ⓗ of the decoded base layer transferred from the picture buffer of the base layer decoding apparatus, and the image information ⑧ of the decoded enhancement layer transferred from the picture buffer of the enhancement layer decoding apparatus. As described above, the prediction unit 1225 transfers the texture information, the motion information, the intra prediction mode information, and the residual information obtained from the base layer to the generalized reference picture generation unit 1220.

Here, the information transferred from the generalized reference picture generation unit 1220 and the generalized reference block generation unit 1210 may be scaled or upsized according to the characteristics of the enhancement layer.

The generalized reference picture or generalized reference block may be generated by reflecting a slice type of the reference layer.

For example, when the reference layer is I-slice, the generalized reference picture generation unit or generalized reference block generation unit may generate texture by reconstructing the reference layer.

Also, when the reference layer is a P-slice or B-slice and a block of the reference layer is inter-predicted, the generalized reference picture generation unit or the generalized reference block generation unit may generate a prediction signal by using motion information and reference images of the enhancement layer.

When the block of the reference layer is intra-predicted, the generalized reference picture generation unit or the generalized reference block generation unit may perform intra-prediction by using the corresponding intra-prediction mode. In this case, as neighbor reference samples used for intra-prediction, reconstruction samples of the inter-predicted block in the enhancement layer (current layer) may be used.

The thusly generated prediction signals may be used a generalized reference picture/block. Also, an upsampled residual signal of the reference layer may be added to the thusly generated prediction signals so as to be used as a generalized reference picture or reference block.

In detail, a generalized reference block in case that the single loop scheme is applied in the interlayer prediction is a block comprised of prediction signals obtained from the motion information of reference layers when the reference layers are the P-slice and the B-slice and a reference picture with respect to a decoding target picture of the enhancement layer (current layer) through motion compensation. Here, when there is an intra-predicted reference block in the reference layer, the reference block, the reference block may be included in configuring a generalized reference picture through intra-prediction in which 1) neighbor prediction signals of the reference block obtained through the motion compensation are used as reference samples or 2) neighbor samples of the reference sample are used as reference samples in the enhancement layer, in the same prediction mode as the intra-prediction mode applied to the corresponding block in the reference layer.

Meanwhile, a block obtained by further performing picture enhancement on a block comprised of the prediction signals may be used as a generalized reference picture. A block obtained by adding residual information of the reference layer to the prediction signal obtained through a motion compensation may also be used as a generalized reference block.

In addition, a block comprised of the prediction signals or a block obtained by performing picture enhancement on a block obtained by adding residual information to a prediction signal may be used as a reference block.

When the single loop scheme is applied in the inter-layer prediction and a reference layer the I-slice, a texture signal obtained from the reference layer may be used as a generalized reference block. Also, a signal obtained by performing picture enhancement on the texture signal obtained from the reference layer may also be used as a generalized reference block. The generalized reference block may be used as a prediction signal with respect to an encoding target block of the enhancement layer (current layer). When a size of the encoding target block of the current layer is N×N, the generalized reference block generation unit 920 may obtain the block having the size of N×N generated from the picture of the decoded reference layer, as a generalized reference block. The decoding apparatus of the enhancement layer may reconstruct the original block of the enhancement layer by adding the residual signal and the generalized reference block.

The generalized reference picture generation unit 1220 generates a generalized reference picture based on image information of the base layer generated by the prediction unit 1225, decoded image information ⓗ of the base layer transferred from the picture buffer of the base layer, and decoded image information ⑧ of the enhancement layer transferred from the picture buffer of the enhancement layer decoding apparatus. As described above, the prediction unit 1225 transfers texture information of the base layer interpolated through the spatial upsizing unit 1240, motion information of the base layer scaled through the scale upsizing unit 1260, and the residual information of the base layer interpolated through the spatial upsizing unit 1280, to the generalized reference picture generation unit 1220.

A generalized reference picture in case that the single loop scheme is applied in the interlayer prediction is a picture comprised of prediction signals obtained from the motion information of reference layers when the reference layers are the P-slice and the B-slice and a reference picture with respect to an decoding target picture of the enhancement layer (current layer) through motion compensation. Here, when there is an intra-predicted reference block in the reference layer, the reference block, the reference block may be included in configuring a generalized reference picture through intra-prediction in which (1) neighbor prediction signals of the reference block obtained through the motion compensation are used as reference samples or (2) neighbor samples of the reference sample are used as reference samples in the enhancement layer, in the same prediction mode as the intra-prediction mode applied to the corresponding block in the reference layer.

Also, a picture obtained by further performing picture enhancement on a picture comprised of the prediction signals may be used as a generalized reference picture. A signal obtained by adding residual information of the reference layer to a prediction signal obtained through motion compensation may be used as a generalized reference picture. Also, a picture comprised of the prediction signals or a picture obtained by performing picture enhancement on a picture comprised of signals obtained by adding residual information to a prediction signal may be used as a reference picture.

When the single loop scheme is applied in the inter-layer prediction and a reference layer the I-slice, a texture signal obtained from the reference layer may be used as a generalized reference picture. Also, a signal obtained by performing picture enhancement on the texture signal obtained from the reference layer may also be used as a generalized reference picture.

The generalized reference picture may be added to a reference picture list with respect to a current encoding target picture (block) of the enhancement layer (current layer) so as to be used for inter-prediction of the encoding target picture (block). Also, the generalized reference picture may be designated as a reference picture with respect to the encoding target picture (block) of the enhancement layer (current layer) so as to be used, rather than being added to the reference picture list. The generalized reference picture information ⑦ generated by the generalized reference picture generation unit 1220 and the generalized reference block information ⑤ and ⑥ generated by the generalized reference block generation unit 1210 are transferred to the enhancement layer decoding apparatus.

Figure 13:
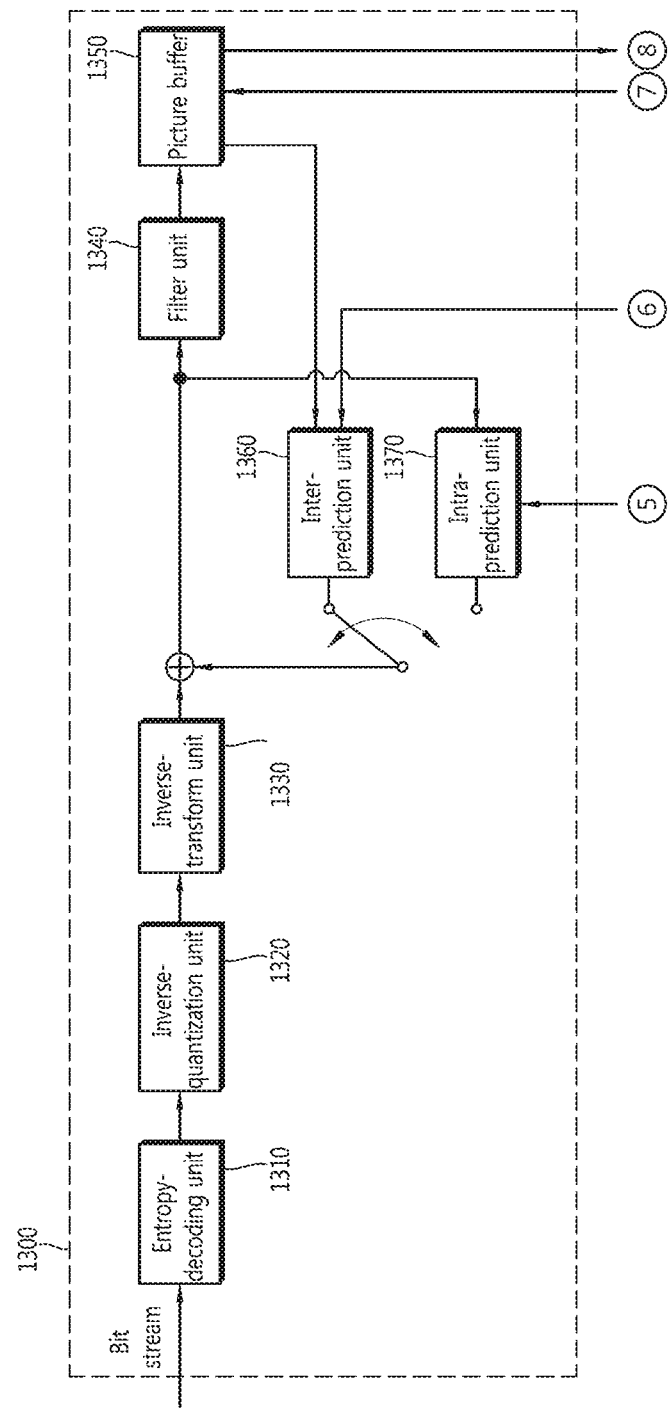
FIG. 13 is a view schematically illustrating a multilayer decoding apparatus for performing interlayer prediction according to an embodiment of the present invention.

FIG. 13 is a view schematically illustrating a multilayer decoding apparatus for performing interlayer prediction according to an embodiment of the present invention. In FIG. 13, an example of an enhancement layer decoding apparatus in the multilayer decoding apparatus is illustrated.

With reference to FIG. 13, an enhancement layer decoding apparatus 1300 includes an entropy-decoding unit 1310, an inverse-quantization unit 1320, an inverse-transform unit 1330, a filter unit 1340, a picture buffer 1350, an inter-prediction unit 1360, and an intra-prediction unit 1370.

The entropy-decoding unit 1310, the inverse-quantization unit 1320, the inverse-transform unit 1330, the filter unit 1340, the picture buffer 1350, the inter-prediction unit 1360, and the intra-prediction unit 1370 may also serve as the respective components of the decoding apparatus as described above with reference to FIG. 2.

For example, the entropy-decoding unit 1110 may receive a bit stream and perform entropy-decoding thereon through a method such as CABAC, CAVLC, or the like. A bit stream input to the enhancement layer decoding apparatus 1300 may be a bit stream comprised of a portion or the entirety of the whole bit stream, as information regarding an image having higher picture quality, larger size, higher resolution and/or higher frame rate than those of the bit stream input to the base layer decoding apparatus. The inverse-quantization unit 1320 may inversely quantize a quantized transform coefficient obtained from the entropy-decoding unit 1310. The inverse-transform unit 1330 performs inverse-quantization according to a transforming method applied to the quantized transform coefficient. For example, when the quantized transform coefficient is based on DCT, the inverse-transform unit 1330 may perform inverse-quantization by using IDCT, and when the quantized transform coefficient is based on DST, the inverse-transform unit 1330 may perform inverse-quantization by using IDST.

The picture buffer unit 1350 may store decoded image information, and the filter unit 1340 may apply an in-loop filter to the reconstructed image (picture) before being stored in the picture buffer 1350.

When the decoding apparatus 1300 performs inter-prediction on a current block, the inter-prediction unit 1360 performs inter-prediction based on a reference picture stored in the picture buffer unit 1350. When the decoding apparatus 1300 performs intra-prediction on a current block, the intra-prediction unit 1370 performs intra-prediction on the current block based on information regarding a neighbor block. Details of the inter-prediction and intra-prediction are the same as described above.

With reference to FIG. 13, the image information processed in the decoding apparatus 1100 with respect to the base layer is transmitted to the enhancement layer decoding apparatus 1300 through the interlayer prediction unit 1200. For example, information ⑦ regarding a generalized reference picture generated by the generalized reference picture generation unit of the interlayer prediction unit is transferred to the picture buffer 1350. Also, information ⑤ and ⑥ regarding the generalized reference block generated by the generalized reference block generation unit of the interlayer prediction unit is transferred to the intra-prediction unit 1370 and the inter-prediction unit 1360.

As illustrated, the intra-prediction unit 1370 may use the image information ⑤ of the base layer transmitted from the interlayer prediction unit, as a prediction signal with respect to a current block of the enhancement layer. Also, the intra-prediction unit 1020 may perform intra-prediction on the current block of the enhancement layer by using neighbor reference samples of the enhancement layer. Whether to use the generalized reference block or whether to perform intra-prediction within the current layer may be determined based on an instruction or information transmitted from the encoding apparatus.

As illustrated, the inter-prediction unit 1360 may use image information ⑥ of the base layer transmitted from the interlayer prediction unit, as a prediction signal with respect to the current block of the enhancement layer. The inter-prediction unit 1360 may perform a motion estimation by using the image information ⑦ of the base layer stored in the picture buffer 1350. Based on which information the current block is to be predicted may be previously determined between the encoding apparatus/decoding apparatus or may be instructed by the encoding apparatus.

Here, it has been described that the inter-prediction unit 1360 that performs inter-prediction on the input image of the enhancement layer and the intra-prediction unit 1370 that performs even intra-prediction on the input image of the enhancement layer perform prediction based on the information transferred from the interlayer prediction unit in the enhancement layer decoding apparatus 1300, but the present invention is not limited thereto. For example, the enhancement layer decoding apparatus may include an extra prediction unit, apart from the inter-prediction unit 1360 and/or the intra-prediction unit 1370, and the extra prediction unit may perform prediction based on the information ⑤ and ⑥ transmitted from the interlayer prediction unit. In this case, information input to or output from the inter-prediction unit 1360, the intra-prediction unit 1370, and the extra prediction unit may be selected by installing a switch.

Figure 14:
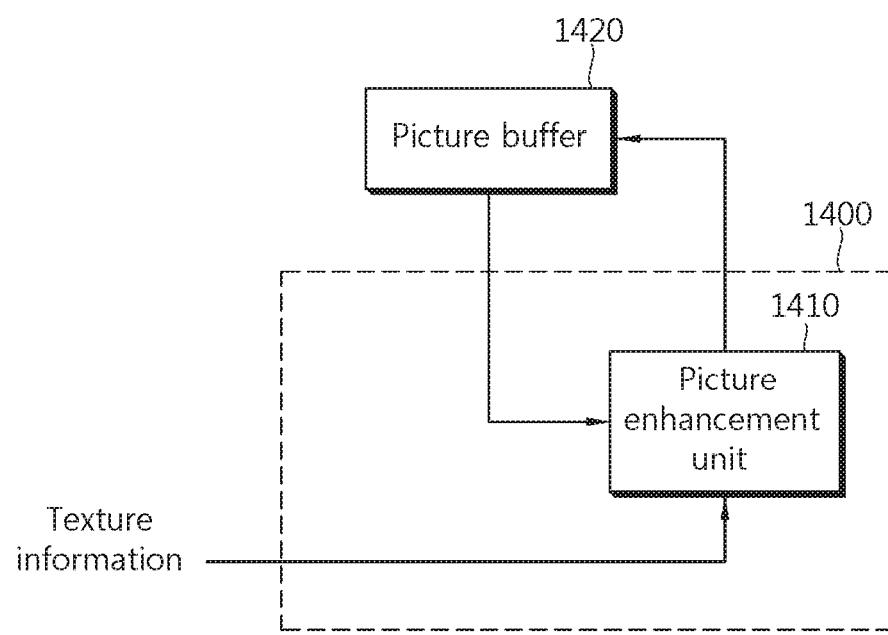
FIG. 14 is a view schematically illustrating an example of a configuration of a reference picture generation unit generalized in an interlayer prediction unit to which the present invention is applied.

FIG. 14 is a view schematically illustrating an example of a configuration of a reference picture generation unit generalized in the interlayer prediction unit to which the present invention is applied.

With reference to FIG. 14, a generalized reference picture generation unit 1400 includes a motion compensation unit 1410 and a picture enhancement unit 1420.

The motion compensation unit 1410 receives encoding information and residual information of a base layer (reference layer) from the interlayer prediction unit (925 in FIGS. 9 and 1225 in FIG. 12). Here, when the base layer is B-slice or P-slice, the encoding information may include motion information of the base layer. Also, when the base layer is P-slice or B-slice, the encoding information may include intra-prediction mode information of the base layer.

In detail, in the generalized reference picture generation unit 1400 employing a single loop scheme, the motion compensation unit 1410 receives motion information and residual information with respect to a current block in the base layer (reference layer), corresponding to the current block of the enhancement layer, and performs motion compensation.

As described above, as for the motion information and the residual information of the base layer input to the motion compensation unit 1410, the motion information and the residual information of the base layer may be scaled or upsized (upsampled) in the interlayer prediction unit so as to be input.

Also, the motion compensation unit 1410 may perform motion compensation upon receiving an intra-prediction mode of the base layer besides the motion information. As described above, when a block of the base layer (reference layer) is intra-predicted, the motion compensation unit 1410 may perform intra-prediction on the corresponding block by using the corresponding intra-prediction mode. Here, as neighbor reference samples used for intra-prediction, a reconstruction sample of a block inter-predicted in the enhancement layer (current layer) may be received from the picture buffer 1430 and used, or as a neighbor block sample of an intra-predicted block, a sample of a block which has been motion-compensated in the process of generating a generalized reference picture may be used.

In the generalized reference picture generation unit 1400 employing the single loop scheme, the picture enhancement unit 1420 may perform a process (picture enhancement) of making a picture output from the motion compensation unit 1410 the same as or similar to an input original picture of the enhancement layer (current layer).

In detail, the picture enhancement unit 1420 receives a motion-compensated picture and performs picture enhancement on input image information (texture information) based on the image information stored in the picture buffer 1430 of the enhancement layer. Also, the picture enhancement unit 1420 may receive the image information (texture information) of the base layer and the image information stored in the picture buffer 1430 of the enhancement layer, and perform picture enhancement on the input image information (texture information) based on the image information stored in the picture buffer 1430 of the enhancement layer. The image information stored in the picture buffer 1430 of the enhancement layer as a basis of picture enhancement may be an original image of the enhancement layer.

As one of methods for enhancing a picture, the picture enhancement unit 1420 may apply at least one of the input image information (texture information), adaptive loop filter (ALF), and a sample adaptive offset (SAO). In the case of the decoding apparatus, a picture enhancement method, a filter coefficient, and the like, applied in the picture enhancement unit 1420 may be determined in the encoding apparatus and signaled.

Figure 15:
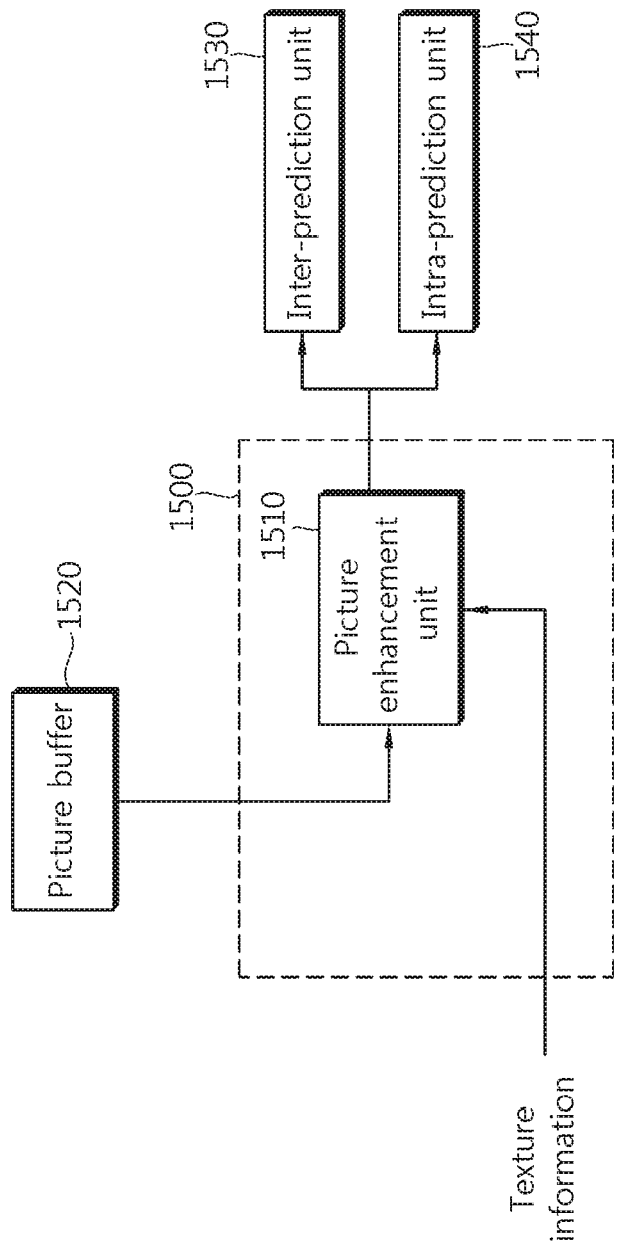
FIG. 15 is a view schematically illustrating an example of a configuration of a reference block generation unit generalized in an interlayer prediction unit to which the present invention is applied.

FIG. 15 is a view schematically illustrating an example of a configuration of a reference block generation unit generalized in an interlayer prediction unit to which the present invention is applied.

With reference to FIG. 15, a generalized reference block generation unit 1500 includes a motion compensation unit 1510 and a picture enhancement unit 1520.

The motion compensation unit 1510 receives encoding information and residual information of a base layer (reference layer) from the interlayer prediction unit (925 in FIGS. 9 and 1225 in FIG. 12). Here, when the base layer is B-slice or P-slice, the encoding information may include motion information of the base layer. Also, when the base layer is P-slice or B-slice, the encoding information may include intra-prediction mode information of the base layer.

In detail, in the generalized reference picture generation unit 1500 employing a single loop scheme, the motion compensation unit 1510 receives motion information and residual information with respect to a current block in the base layer (reference layer), corresponding to the current block of the enhancement layer, and performs motion compensation.

As described above, as for the motion information and the residual information of the base layer input to the motion compensation unit 1510, the motion information and the residual information of the base layer may be scaled or upsized (upsampled) in the interlayer prediction unit so as to be input.

Also, the motion compensation unit 1510 may perform motion compensation upon receiving an intra-prediction mode of the base layer besides the motion information. As described above, when a block of the base layer (reference layer) is intra-predicted, the motion compensation unit 1410 may perform intra-prediction on the corresponding block by using the corresponding intra-prediction mode. Here, as neighbor reference samples used for intra-prediction, a reconstruction sample of a block inter-predicted in the enhancement layer (current layer) may be received from the picture buffer 1530 and used, or as a neighbor block sample of an intra-predicted block, a sample of a block which has been motion-compensated in the process of generating a generalized reference picture may be used.

In the generalized reference picture generation unit 1500 employing the single loop scheme, the picture enhancement unit 1520 may perform a process (picture enhancement) of making a block output from the motion compensation unit 1510 the same as or similar to an input original block of the enhancement layer (current layer).

In detail, the picture enhancement unit 1520 receives a motion-compensated block and performs picture enhancement on input image information (texture information) based on the image information stored in the picture buffer 1530 of the enhancement layer. Also, the picture enhancement unit 1520 may receive the image information (texture information) of the base layer and the image information stored in the picture buffer 1530 of the enhancement layer, and perform picture enhancement on the input image information (texture information) based on the image information stored in the picture buffer 1530 of the enhancement layer. The image information stored in the picture buffer 1530 of the enhancement layer as a basis of picture enhancement may be an original image of the enhancement layer.

As one of methods for enhancing a picture, the picture enhancement unit 1520 may apply at least one of the input image information (texture information), adaptive loop filter (ALF), and a sample adaptive offset (SAO). In the case of the decoding apparatus, a picture enhancement method, a filter coefficient, and the like, applied in the picture enhancement unit 1520 may be determined in the encoding apparatus and signaled.

The picture reconstructed in the picture enhancement layer 152 is transferred to the inter-prediction unit 1540 or the intra-prediction unit 1550 of the enhancement layer as described above with reference to FIGS. 12 and 13.

FIG. 16 is a flow chart illustrating interlayer prediction performed according to an embodiment of the present invention. Here, for the convenience of explanation, it is described that a multilayer encoding apparatus and a multilayer decoding apparatus (referred to as an 'encoding/apparatus/decoding apparatus', hereinafter) determine a prediction method with respect to a current block of an enhancement layer.

With reference to FIG. 16, the encoding apparatus/decoding apparatus determines whether to perform interlayer prediction on a current block of an enhancement layer (S1610). In this case, the encoding apparatus may determine whether to perform interlayer prediction in consideration of PDO and/or data transmission cost, or the like, or whether to perform single layer prediction within an enhancement layer. The encoding apparatus may transmit a flag indicating whether to perform interlayer prediction or whether to perform single layer prediction to the decoding apparatus.

The decoding apparatus may determine whether to perform interlayer prediction on the current block of the enhancement layer or whether to perform single layer prediction according to an indication of the flag received from the encoding apparatus. For example, when a flag indicating performing of interlayer prediction is interLayerPred_flag and a value of interLayerPred_flag is 1, the decoding apparatus may perform interlayer prediction, and when the value of interLayerPred_flag is 0, the decoding apparatus may perform single layer prediction. Here, it is described that the flag having the value 1 indicates interlayer prediction, but of course, it may be set such that the flag having the value 0 indicates interlayer prediction.

When interlayer prediction is not performed, prediction may be performed within an enhancement layer with respect to a current block of the enhancement layer (S1620). For example, when a slice type including the current block of the enhancement layer is an intra-slice (I-slice), intra-prediction may be performed based on a reconstructed reference block (neighbor block) located in the vicinity of a block (current block) as a target of encoding and decoding currently, thus performing prediction on the current block. Here, examples of intra-prediction modes that can be applied to the current block of the enhancement layer are the same as described above with reference to FIG. 3. The encoding apparatus/decoding apparatus may perform intra-prediction on the enhancement layer by using any one of the directional prediction mode or non-directional prediction mode.

The encoding apparatus transmits information regarding an intra-prediction mode to be used for the current block of the enhancement layer to the decoding apparatus, and the decoding apparatus may perform prediction on the current block of the enhancement layer according to the intra-prediction mode indicated by the information received from the encoding apparatus.

Also, when a slice type including the current block of the enhancement layer is the inter-slice (P-slice, B-slice, etc.) and single layer prediction is performed within the enhancement layer, the encoding apparatus/decoding apparatus may perform inter-prediction on the current block based on reference pictures within the same enhancement layer. Here, the encoding apparatus/decoding apparatus may perform inter-prediction on the current block by using any one of inter-prediction methods such as a skip mode, a merge mode, an AMVP, and the like, as described above.

The encoding apparatus may transmit information regarding an inter-prediction method to be used for the current block of the enhancement layer, and the decoding apparatus may perform prediction on the current block of the enhancement layer according to the inter-prediction method indicated by the information received from the encoding apparatus.

Meanwhile, when the interlayer prediction is performed, the encoding/decoding apparatus may perform prediction on the current block of the enhancement layer based on a generalized reference picture or a generalized reference block generated from a reference layer (base layer) (S1630). Here, the interlayer prediction method may vary according to a slice type of the enhancement layer.

Interlayer prediction performed in the encoding apparatus/decoding apparatus according to a slice type of the enhancement layer will be described.

In Case that Slice Type of Enhancement Layer or that of Base Layer is Intra-Slice (I-Slice) and Interlayer Prediction is Applied The encoding apparatus/decoding apparatus may perform prediction on the current block of the enhancement layer based on the generalized reference picture or the generalized reference block generated by using decoded picture information of the reference layer (base layer).

Here, when picture sizes of layers are different, the decoded picture of the reference layer may be obtained and then upsampled according to the picture size of the enhancement layer to thus generate a generalized reference picture or a generalized reference block. Upsampling may be performed in the interlayer prediction unit as described above with reference to FIG. 9 or 12, for example.

Upsampling may be performed by using at least one of a fixed type filter using a fixed filter coefficient and an adaptive filter having a different filter coefficient adaptively according to, a slice, a picture, and a block.

In Case of Using Generalized Reference Picture

When a slice type of the enhancement layer or that of the base layer is the intra-slice and interlayer prediction is performed by using a generalized reference picture, the encoding apparatus/decoding apparatus may configure a reference picture list with respect to the current block of the enhancement layer including a generalized reference picture (upsampled decoded picture of the reference layer or a decoded picture, which has not been upsampled, of the reference layer). The encoding apparatus/decoding apparatus may perform inter-prediction on the current block of the enhancement layer by using the generalized reference picture included in the reference picture list with respect to the current block of the enhancement layer, as a reference picture.

In the case of performing prediction on the current block of the enhancement layer by using the generalized reference picture, the inter-prediction method such as the AMVP, the merge mode, the skip mode, and the like, may be used.

In case of performing interlayer prediction, the generalized reference picture may be used as a reference picture with respect to the current block of the enhancement layer, even without adding the generalized reference picture (upsampled decoded picture of the reference layer or a decoded picture, which has not been upsampled, of the reference layer) to the reference picture list. When the generalized reference picture is used as a reference picture of the current block, the encoding apparatus may transmit information indicating the generalized reference picture as a reference picture with respect to the current block to the decoding apparatus. When the decoding apparatus receives the information indicating that the reference picture with respect to the current block of the enhancement layer is the generalized reference picture from the encoding apparatus, the decoding apparatus may perform inter-prediction on the current block of the enhancement layer by using the generalized reference picture.

Here, for the convenience of explanation, the generalized reference picture is described as an upsampled decoded picture of the reference layer or a decoded picture which has not been upsampled of the reference layer, but as shown in FIG. 14, a generalized reference picture may be generated by performing picture enhancement on the decoded picture of the base layer.

Picture enhancement is a method for minimizing a difference between a decoded picture used as the reference picture and the original picture. In other words, picture enhancement may be minimizing a difference between the generalized reference picture generated based on a reference layer and the original picture. Here, the original picture may refer to a picture input to the encoding apparatus of the enhancement layer.

For example, the encoding apparatus calculates a filter coefficient that is able to minimize a difference between the original picture and the generalized reference picture, and then, apply a filter having a filter coefficient to the upsampled decoded picture or a decoded picture which has not been upsampled, obtained from the reference layer to generate the generalized reference picture. The encoding apparatus may transmit information regarding the calculated filter coefficient to the decoding apparatus. The decoding apparatus may generate a generalized reference picture by applying the filter coefficient received from the encoding apparatus to an upsampled decoded picture or a decoded picture, which has not been upsampled, obtained from the reference layer.

In Case of Using Generalized Reference Block

In case that a slice type of an enhancement layer or that of a base layer is intra-slice and interlayer prediction is performed by using a generalized reference block, the encoding apparatus/decoding apparatus may obtain prediction signals (prediction block) with respect to a current block of the enhancement layer from a generalized reference block generated based on a decoded picture of a base layer (reference layer).

Here, when sizes of the pictures of the reference layer (base layer) and the enhancement layer are different, upsampling may be performed on the decoded picture obtained from the reference layer. Upsampling may be performed in the interlayer prediction unit as described above with reference to FIG. 9 or 12.

Upsampling may be performed by using at least one of a fixed type filter using a fixed filter coefficient and an adaptive filter having a different filter coefficient adaptively according to, a slice, a picture, and a block.

In performing interlayer prediction, pixel values obtained from a generalized reference block of the reference layer (base layer) corresponding to the current block of the enhancement layer may be determined to be prediction signals (prediction block) with respect to a current block of the enhancement layer. Here, the generalized reference block may be a block obtained by upsampling a decoded picture obtained from the reference layer (base layer) or may be a block obtained without upsampling.

The current block of the enhancement layer may be encoded/decoded to have various block sizes according to a quad-tree structure. For example, the current block of the enhancement layer may be encoded/decoded, predicted, or transformed by any one of CU, PU, and TU. In this case, the generalized reference block may be comprised of pixels of the reference layer (base layer) so as to correspond to the size of the current block of the enhancement layer, or may be upsampled to correspond to a size of the current block of the enhancement layer.

Picture enhancement may additionally be performed also on a decoded image obtained from the reference layer (base layer) such that the generalized reference block can be closer to the original of the target block (current block) to be encoded/decoded of the enhancement layer. In this case, picture enhancement may be minimizing a difference between the generalized reference block generated based on the reference layer and the current block (original block) of the enhancement layer.

The encoding apparatus may calculate a filter coefficient that may be able to minimize a difference between the original picture and the generalized reference block, and then, apply a filter having the filter coefficient to an upsampled decoded block or a decoded block, which has not been upsampled, obtained from the reference layer to generate a generalized reference block.

Also, the encoding apparatus may transmit information regarding the calculated filter coefficient to the decoding apparatus. The decoding apparatus may generate a generalized reference block by applying a filter having the filter coefficient received from the encoding apparatus to the upsampled decoded block or the decoded block, which has not been upsampled, obtained from the reference layer.

In Case that Slice Type of Enhancement Layer or that of Base Layer is Inter-Slice (P-Slice, B-Slice, Etc.) and Interlayer Prediction is Applied The encoding apparatus/decoding apparatus may also perform prediction on a current block of an enhancement layer based on a generalized reference picture or a generalized reference block generated by using encoding information and residual information of a reference layer (base layer).

Here, the encoding information that may be obtained from the reference layer (base layer) may include motion information such as a motion vector, a reference picture index, an AMVP candidate index, a merge candidate index, or the like, and intra-prediction mode information.

When the sizes of pictures of layers (e.g., between the base layer (reference layer) and the enhancement layer) are different, the encoding apparatus/decoding apparatus may upsample the motion information obtained from the reference layer according to the picture size of the enhancement layer.

In Case of Using Generalized Reference Picture

When a slice type of the enhancement layer or that of the base layer is the inter-slice and interlayer prediction is performed by using a generalized reference picture, the encoding apparatus/decoding apparatus may perform prediction on an encoding or decoding target block (current block) of the enhancement layer based on a generalized reference picture by using encoding information and residual information of the reference layer (base layer).

The encoding apparatus/decoding apparatus may generate a generalized reference picture with respect to a current block of the enhancement layer based on a prediction block generated through motion information obtained from the reference layer and motion compensation using reference pictures within the enhancement layer.

When a reference block of the reference layer (base layer) has been encoded by intra-prediction, prediction signals (prediction picture) generated by using already reconstructed (motion-compensated) neighbor samples and the intra-prediction mode applied to the reference block may be used as a generalized reference picture. Here, a picture generated by adding a residual signal of the reference layer to the prediction signal may also be used as a generalized reference picture.

Also, when the picture size of the reference layer (base layer) and that of the enhancement layer are different, a generalized reference picture may be generated after prediction signals (prediction block) and/ore residual signals (residual block) of the reference layer are upsampled.

Interlayer prediction may be performed on the current block of the enhancement layer by configuring a reference picture list with respect to the current block of the enhancement layer including the generalized reference picture. The generalized reference picture included in the reference picture list may be used as a reference picture when inter-prediction is performed on the current block of the enhancement layer.

In this case, the foregoing inter-prediction method such as the AMVP, merge mode, skip mode, and the like, may be used, the prediction may be performed on the current block of the enhancement layer.

When the generalized reference picture is included in the reference picture list, a certain reference picture on the reference picture list with respect to the current block of the enhancement layer may be replaced by the generalized reference picture. Also, the generalized reference picture may be simply added to the reference picture list with respect to the current block of the enhancement layer.

Besides, rather than adding the generalized reference picture to the reference picture list, the generalized reference picture may be used as a reference picture with respect to the current block of the enhancement layer. When the generalized reference picture is used as a reference picture of the current block, the encoding apparatus may transmit information indicating the generalized reference picture as a reference picture with respect to the current block to the decoding apparatus. When the decoding apparatus receives the information indicating that the reference picture with respect to the current block of the enhancement layer is the generalized reference picture from the encoding apparatus, the decoding apparatus may perform inter-prediction on the current block of the enhancement layer by using the generalized reference picture.

Also, when the slice type of the enhancement layer is the inter-slice, picture enhancement may be additionally performed, like the case that the slice type of the enhancement layer is the intra-slice. For example, the encoding apparatus may calculate a filter coefficient that may be able to minimize a difference between an original picture and the generalized reference picture, and apply a filter having the filter coefficient to an upsampled decoded picture or a decoded picture, which has not been upsampled, obtained from a reference layer, to thus generate a generalized reference picture. The encoding apparatus may transmit information regarding the calculated filter coefficient to the decoding apparatus. The decoding apparatus may apply the filter having the filter coefficient received from the encoding apparatus to the upsampled decoded picture or the decoded picture, which has not been upsampled, obtained from the reference layer, to thus generate a generalized reference picture.

In Case of Using Generalized Reference Block

When a slice type of the enhancement layer or that of the base layer is the inter-slice and interlayer prediction is performed by using a generalized reference block, the encoding apparatus/decoding apparatus may obtain prediction signals (prediction block) with respect to an encoding or decoding target block (current block) of the enhancement layer from a generalized reference block by using encoding information and residual information of the reference layer (base layer).

The encoding apparatus/decoding apparatus may generate a generalized reference block with prediction signals (prediction block) obtained by performing motion compensation based on motion information obtained from the reference layer (base layer) and reference pictures within the enhancement layer.

When a reference block of the reference layer (base layer) has been encoded by intra-prediction, prediction signals (prediction block) generated by using already reconstructed (motion-compensated) neighbor samples and the intra-prediction mode applied to the reference block may be used as a generalized reference block. Here, a picture generated by adding a residual signal of the reference layer to the prediction signal may also be used as a generalized reference picture.

Even in the case of using the generalized reference block, the encoding apparatus/decoding apparatus may additionally perform picture enhancement. The encoding apparatus may calculate a filter coefficient that may be able to minimize a difference between an original picture and the generalized reference block, and apply a filter having the filter coefficient to an upsampled decoded block or a decoded block, which has not been upsampled, obtained from a reference layer, to thus generate a generalized reference block. The encoding apparatus may transmit information regarding the calculated filter coefficient to the decoding apparatus. The decoding apparatus may apply the filter having the filter coefficient received from the encoding apparatus to the upsampled decoded block or the decoded block, which has not been upsampled, obtained from the reference layer, to thus generate a generalized reference block.

The encoding apparatus/decoding apparatus may use the generalized reference block as a prediction block with respect to the current block of the enhancement layer.

As described above, the encoding apparatus/decoding apparatus may reconstruct or encode a current picture of the enhancement layer based on the results of the single layer prediction or interlayer prediction with respect to the current block of the enhancement layer (S1650).

As described above, the encoding apparatus may transform, quantize, and entropy-encode the generated residual block (residual signal) based on the prediction results, and transmit the same to the decoding apparatus. Here, the encoding apparatus may multiplex a bit stream output from the base layer encoding apparatus and the enhancement layer encoding apparatus by using a multiplexer and transmit the same.

As described above, the decoding apparatus may also reconstruct a picture (or video) having high picture quality, high resolution, large size and/or high frame rate supported by the enhancement layer based on the prediction block (prediction signal) and the residual block (residual signal) generated through prediction. The bit stream input to the encoding apparatus may be divided by a demultiplexer into the base layer and the enhancement layer and input to the base layer encoding apparatus and the enhancement layer encoding apparatus, respectively.

In the above description, the base layer is described as a reference layer and the enhancement layer is described as an encoding or decoding target layer in the multilayer encoding/decoding, but this is simply based on the assumption of encoding/decoding of multilayer comprised of two layers for the convenience of explanation. Namely, this is merely illustrative and the present invention is not limited to the double-layer configuration. In an embodiment of the present invention, an encoding or decoding target layer may be interlayer-predicted by using at least one of lower layers of the target layer itself as a reference layer or may be a unilayer-predicted within an encoding or decoding target layer.

In the above description, in order to perform SVC, information obtained from a lower layer is upsampled in size, but this is merely for the convenience of explanation, and enhancement of video information of a lower layer according to video information of a higher layer, like upsampling, may be performed even on picture quality, resolution, and a frame rate, as well as a picture size, in the same manner.

In the above description, the case of using the generalized reference picture and the case of using the generalized reference are separately described, but this merely for the convenience of explanation. The generalized reference picture and the generalized reference block may be used together for interlayer prediction or only any one them may be used alone. When any of the generalized reference picture and the generalized reference block is used, the encoding apparatus/decoding apparatus may include only a required element among the generalized reference block generation unit and the generalized reference picture generation unit.

Also, in the exemplary system as described above, the methods are described based on the flow chart by sequential steps or blocks, but the present invention is not limited to the order of the steps, and a step may be performed in different order from another step as described above or simultaneously performed. Also, the foregoing embodiments include various exemplary embodiments. For example, a combination of the respective embodiments should also be understood as an embodiment of the present invention.

The invention claimed is:

1. An interlayer prediction decoding method performed by an interlayer prediction decoding apparatus comprising one or more processors and a memory, the method comprising:
    obtaining a residual block with respect to a current block from an input bitstream;
    determining whether to apply interlayer prediction to an enhancement layer;
    performing prediction on the current block of the enhancement layer based on a picture of a reference layer, in response to a determination that the interlayer prediction is to be applied; and
    reconstructing the current block by adding the residual block to a prediction block obtained by performing the prediction on the current block,
    wherein performing the prediction on the current block comprises:
    reconstructing the picture of the reference layer by decoding the input bitstream including the reference layer;
    generating, from the reconstructed picture of the reference layer, a generalized reference picture for interlayer prediction of a current picture of the enhancement layer;
    constructing a reference picture list for the current picture by adding the generalized reference picture to at least one reference picture belonging to a same enhancement layer as the current picture; and
    performing the prediction on the current block of the enhancement layer based on the reference picture list and motion information of the current block, and
    wherein the obtaining the residual block comprises:
    generating one or more quantized transform coefficients by decoding the input bitstream;
    generating one or more transform coefficients by inverse-quantizing the one or more quantized transform coefficients; and
    generating the residual block based on the one or more transform coefficients.

2. The method of claim 1, wherein whether to apply the interlayer prediction to the enhancement layer is determined based on a flag information indicating the interlayer prediction.

3. The method of claim 1, wherein the generalized reference picture is generated by upsampling the reconstructed picture of the reference layer according to a picture size of the enhancement layer.

4. The method of claim 3, wherein the upsampling is performed by applying a filter with predetermined filter coefficients to the reconstructed picture of the reference layer.

5. The method of claim 4, wherein the filter with the predetermined filter coefficients is representative of either a first filter with a fixed filter coefficients or a second filter with adaptive filter coefficients which are variable according to a slice, a picture, or a block.

6. The method of claim 1, wherein the motion information of the current block is derived based on motion information of a co-located block within the generalized reference picture.

7. An interlayer prediction encoding method performed by an interlayer prediction encoding apparatus comprising one or more processors and a memory, the method comprising:
    determining whether to apply interlayer prediction to an enhancement layer;
    performing prediction on a current block of the enhancement layer based on a picture of a reference layer to generate a prediction block, in response to a determination that the interlayer prediction is to be applied;
    obtaining a residual block with respect to the current block by subtracting the prediction block from the current block; and encoding the residual block, wherein performing the prediction on the current block comprises:

determining the picture of the reference layer;

generating, from the determined picture of the reference layer, a generalized reference picture for interlayer prediction of a current picture of the enhancement layer; and performing the prediction on the current block of the enhancement layer based on the generalized reference picture to generate the prediction block, wherein the generalized reference picture is added to at least one reference picture belonging to a same enhancement layer as the current picture for constructing a reference picture list for the current picture, and wherein the encoding the residual block comprises:

generating one or more quantized transform coefficients for the residual block by quantizing one or more transform coefficients for the residual block; and encoding the one or more quantized transform coefficients for the residual block to generate a bitstream.

8. A non-transitory computer-readable recording medium storing a bitstream that is generated by an interlayer prediction encoding method, the method comprising:

determining whether to apply interlayer prediction to an enhancement layer;

performing prediction on a current block of the enhancement layer based on a picture of a reference layer to generate a prediction block, in response to a determination that the interlayer prediction is to be applied;

obtaining a residual block with respect to the current block by subtracting the prediction block from the current block; and encoding the residual block, wherein performing the prediction on the current block comprises:

determining the picture of the reference layer;

generating, from the determined picture of the reference layer, a generalized reference picture for interlayer prediction of a current picture of the enhancement layer; and performing the prediction on the current block of the enhancement layer based on the generalized reference picture to generate the prediction block, wherein the generalized reference picture is added to at least one reference picture belonging to a same enhancement layer as the current picture for constructing a reference picture list for the current picture, and wherein the encoding the residual block comprises:

generating one or more quantized transform coefficients for the residual block by quantizing one or more transform coefficients for the residual block; and encoding the one or more quantized transform coefficients for the residual block to generate a bitstream.

* * * * *